(12) United States Patent
Mitani et al.

(10) Patent No.: US 12,555,997 B2
(45) Date of Patent: Feb. 17, 2026

(54) POWER SUPPLY SYSTEM, AND MOVING OBJECT INCLUDING POWER SUPPLY SYSTEM

(71) Applicant: HONDA MOTOR CO., LTD., Tokyo (JP)

(72) Inventors: Manabu Mitani, Wako (JP); Minato Nakano, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 9 days.

(21) Appl. No.: 18/618,023

(22) Filed: Mar. 27, 2024

(65) Prior Publication Data

US 2024/0332962 A1    Oct. 3, 2024

(30) Foreign Application Priority Data

Mar. 31, 2023 (JP) ................ 2023-056854

(51) Int. Cl.
*H02J 1/10* (2006.01)
*H02J 1/108* (2026.01)

(52) U.S. Cl.
CPC .............. *H02J 1/109* (2020.01); *H02J 1/108* (2013.01)

(58) Field of Classification Search
CPC .... H02J 1/109; H02J 1/108; H02J 7/34; H02J 7/35
See application file for complete search history.

(56) References Cited

U.S. PATENT DOCUMENTS

| | | | |
|---|---|---|---|
| 2013/0049676 A1* | 2/2013 | Ishikawa | B60L 53/53 320/103 |
| 2020/0007040 A1* | 1/2020 | Handa | H02J 7/00 |
| 2022/0204173 A1* | 6/2022 | Barraco | B64D 27/357 |

FOREIGN PATENT DOCUMENTS

JP    2022-529997 A    6/2022

* cited by examiner

*Primary Examiner* — Lincoln D Donovan
*Assistant Examiner* — Alex W Lam
(74) *Attorney, Agent, or Firm* — Rankin, Hill & Clark LLP

(57) ABSTRACT

A power supply system includes: a first power supply circuit for supplying, to a first load device, DC power output from a first main power source device; a second power supply circuit for supplying, to a second load device, DC power output from a second main power source device; a first connection circuit capable of connecting the first power supply circuit and the second power supply circuit to each other; and a first auxiliary power storage device connected to the first connection circuit in parallel with the first main power source device and the second main power source device.

17 Claims, 22 Drawing Sheets

FIG. 9

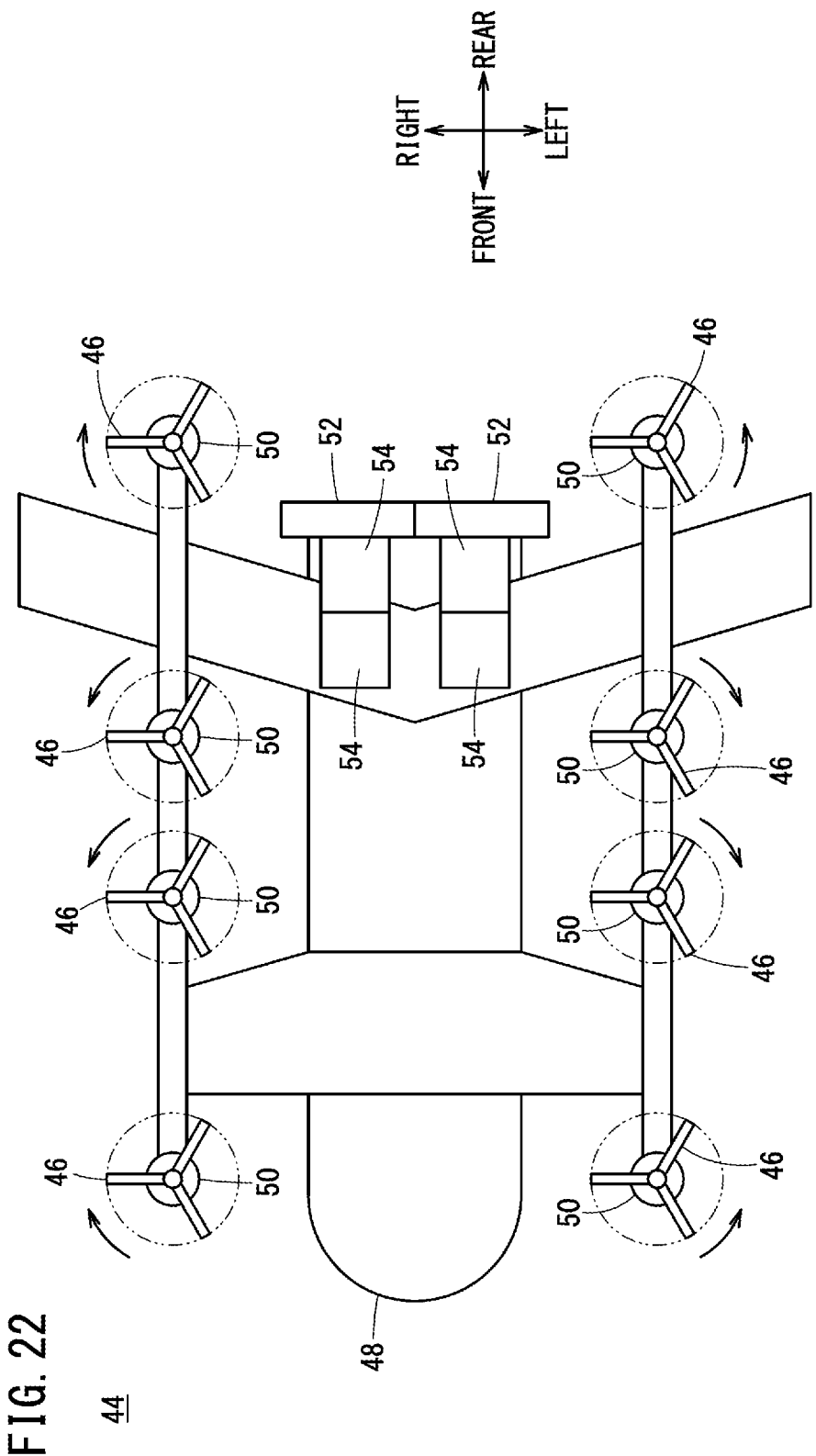

POWER SUPPLY SYSTEM, AND MOVING OBJECT INCLUDING POWER SUPPLY SYSTEM

CROSS-REFERENCE TO RELATED APPLICATIONS

This application is based upon and claims the benefit of priority from Japanese Patent Application No. 2023-056854 filed on Mar. 31, 2023, the contents of which are incorporated herein by reference.

BACKGROUND OF THE INVENTION

Field of the Invention

The present invention relates to a power supply system, and a moving object including the power supply system.

Description of the Related Art

In recent years, research and development have been conducted on electrification technology that contributes to energy efficiency in order to ensure that more people have access to affordable, reliable, sustainable and modern energy.

JP 2022-529997 A discloses an aircraft electrical energy supply network (power supply system).

SUMMARY OF THE INVENTION

In the technology related to the electrification technology, there has been a demand for a more satisfactory power supply system, and a moving object including the more satisfactory power supply system.

The present invention has the object of solving the aforementioned problem.

According to a first aspect of the present invention, there is provided a power supply system comprising: a first power supply circuit configured to supply, to a first load device, direct current electric power output from a first main power source device; a second power supply circuit configured to supply, to a second load device, direct current electric power output from a second main power source device; a first connection circuit configured to connect the first power supply circuit and the second power supply circuit to each other; and a first auxiliary power storage device connected to the first connection circuit in parallel with the first main power source device and the second main power source device.

According to a second aspect of the present invention, there is provided a moving object comprising the power supply system according to the first aspect.

According to the present invention, it is possible to provide a more satisfactory power supply system, and a moving object including the more satisfactory power supply system. This in turn contributes to energy efficiency.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 9 is a diagram showing the operation of the power supply system in the event of an abnormality;
FIG. 22 is a schematic view of a moving object.

DETAILED DESCRIPTION OF THE INVENTION

First Embodiment

[Configuration of Power Supply System]

Figure 1:
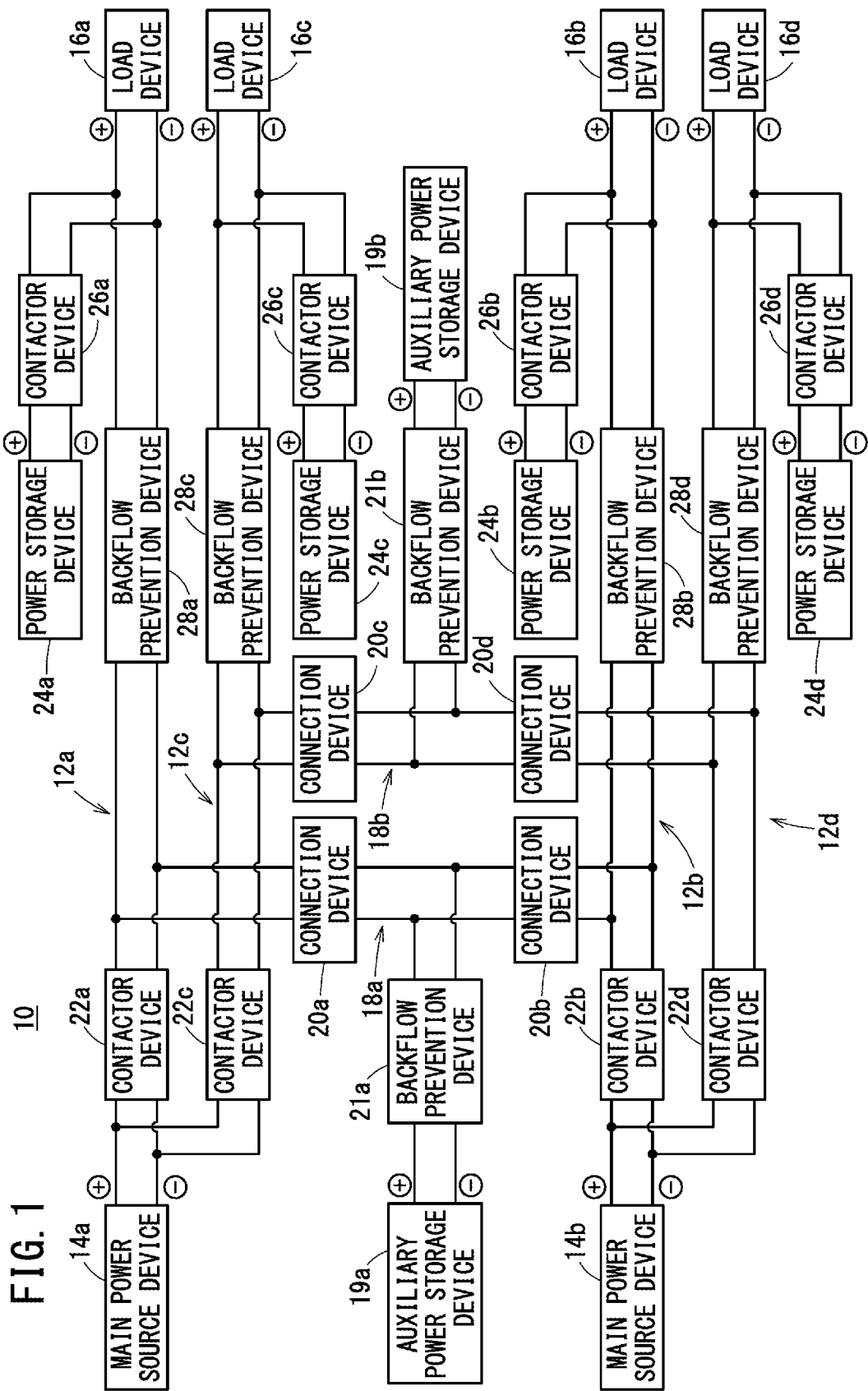
FIG. 1 is a schematic view of a power supply system.

A power supply system of the present embodiment will be described with reference to the drawings. FIG. 1 is a schematic view of a power supply system 10.

The power supply system 10 includes a first power supply circuit 12a, a second power supply circuit 12b, a third power supply circuit 12c, and a fourth power supply circuit 12d. The first power supply circuit 12a supplies, to a first load device 16a, the DC power output from a first main power source device 14a. The second power supply circuit 12b supplies, to a second load device 16b, the DC power output from a second main power source device 14b. The third power supply circuit 12c supplies, to a third load device 16c, the DC power output from the first main power source device 14a. The fourth power supply circuit 12d supplies, to a fourth load device 16d, the DC power output from the second main power source device 14b.

The first main power source device 14a and the second main power source device 14b are power generation devices. The first main power source device 14a and the second main power source device 14b each include an engine, a generator, and a power control unit (all of them not shown). The engine drives the generator, and the generator generates three-phase AC power. The power control unit converts the three-phase AC power into DC power.

The first main power source device 14a and the second main power source device 14b may each include various sensors such as a voltage sensor and a current sensor, and elements such as a fuse, a relay, a breaker, a diode, a transistor, a resistor, a coil, and a capacitor.

The first load device 16a, the second load device 16b, the third load device 16c, and the fourth load device 16d each include an inverter and an electric motor (both of them not shown). The inverter converts the input DC power into three-phase AC power, and the electric motor is driven by the three-phase AC power. The first load device 16a, the second load device 16b, the third load device 16c, and the fourth load device 16d may each include a DC/DC converter and a low-voltage drive device (both of them not shown). The DC/DC converter lowers the voltage of the input DC power, and the low-voltage drive device is driven by the DC power.

The first load device 16a, the second load device 16b, the third load device 16c, and the fourth load device 16d may each include various sensors such as a voltage sensor and a current sensor, and elements such as a fuse, a relay, a breaker, a diode, a transistor, a resistor, a coil, and a capacitor.

The power supply system 10 includes a first connection circuit 18a and a second connection circuit 18b. The power supply system 10 includes a first auxiliary power storage device 19a and a second auxiliary power storage device 19b. The first auxiliary power storage device 19a is connected to the first connection circuit 18a in parallel with the first main power source device 14a and the second main power source device 14b. The second auxiliary power storage device 19b is connected to the second connection circuit 18b in parallel with the first main power source device 14a and the second main power source device 14b.

The power supply system 10 includes first backflow prevention devices 21a and 21b. The first backflow prevention device 21a restricts the supply of electric power from the first connection circuit 18a to the first auxiliary power storage device 19a. The first backflow prevention device 21b restricts the supply of electric power from the second connection circuit 18b to the second auxiliary power storage device 19b.

Figure 2:
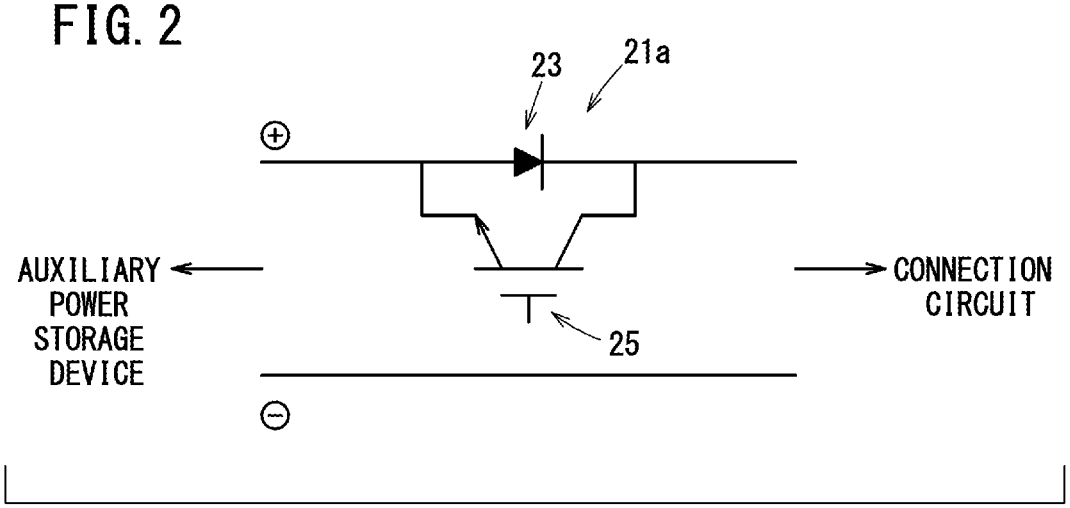
FIG. 2 is a schematic view showing a configuration of a first backflow prevention device.

FIG. 2 is a schematic view showing the configuration of the first backflow prevention device 21a. The first backflow prevention device 21a includes a diode 23 and a transistor 25. The configuration of the first backflow prevention device 21b is the same as the configuration of the first backflow prevention device 21a.

The diode 23 is provided on the positive wire. When the anode voltage is lower than the cathode voltage, the diode 23 allows almost no current to flow. When the anode voltage is higher than the cathode voltage and the potential difference between the cathode and the anode is equal to or higher than a forward voltage, the diode 23 allows a current to flow. As a result, electric power is supplied from the first auxiliary power storage device 19a to the first connection circuit 18a via the diode 23. On the other hand, electric power is not supplied from the first connection circuit 18a to the first auxiliary power storage device 19a via the diode 23.

The transistor 25 is provided to bypass the diode 23. When a current flows from the base to the emitter of the transistor 25, a current flows from the collector to the emitter. As a result, electric power is supplied from the first connection circuit 18a to the first auxiliary power storage device 19a via the transistor 25, and the first auxiliary power storage device 19a is charged. When the first auxiliary power storage device 19a is a primary battery, the first auxiliary power storage device 19a does not need to be charged, and thus the transistor 25 may be omitted.

Figure 3:
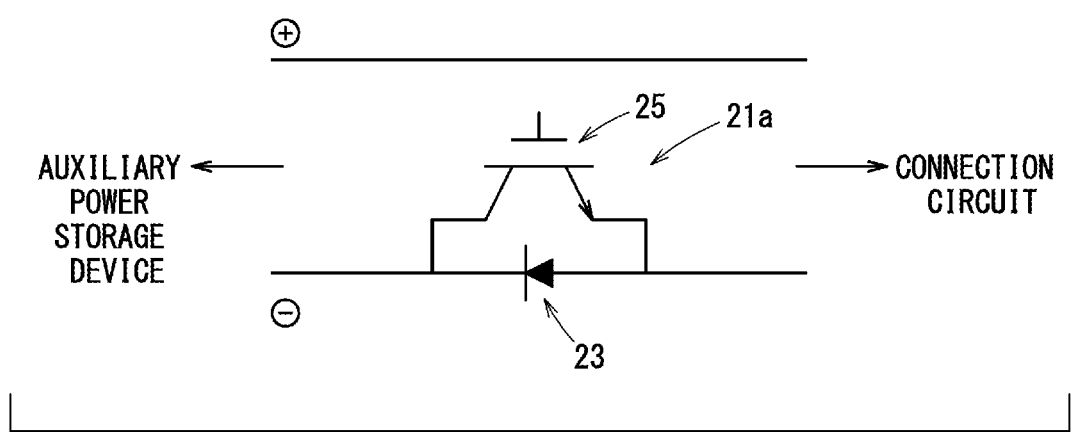
FIG. 3 is a schematic view showing the configuration of the first backflow prevention device.

FIG. 3 is a schematic view showing the configuration of the first backflow prevention device 21a. As shown in FIG. 3, the diode 23 may be provided on the negative wire. Further, the diodes 23 may be provided on both the positive wire and the negative wire.

The first connection circuit 18a is provided with a first connection device 20a capable of connecting the first auxiliary power storage device 19a to the first power supply circuit 12a, and a second connection device 20b capable of connecting the first auxiliary power storage device 19a to the second power supply circuit 12b. The second connection circuit 18b is provided with a third connection device 20c capable of connecting the second auxiliary power storage device 19b to the third power supply circuit 12c, and a fourth connection device 20d capable of connecting the second auxiliary power storage device 19b to the fourth power supply circuit 12d.

The first connection device 20a, the second connection device 20b, the third connection device 20c, and the fourth connection device 20d each include a contactor. The first connection device 20a, the second connection device 20b, the third connection device 20c, and the fourth connection device 20d may each include a relay. The first connection device 20a, the second connection device 20b, the third connection device 20c, and the fourth connection device 20d may each include a breaker. The first connection device 20a, the second connection device 20b, the third connection device 20c, and the fourth connection device 20d may each include a semiconductor switch.

Normally, the connection between the first power supply circuit 12a and the second power supply circuit 12b is cut off. Thus, when an abnormality occurs in one of the first power supply circuit 12a or the second power supply circuit 12b, the other can be prevented from being affected by the abnormality. For example, when an overcurrent occurs in one of the first power supply circuit 12a or the second power supply circuit 12b, the overcurrent is prevented from flowing to the other.

Similarly, the connection between the third power supply circuit 12c and the fourth power supply circuit 12d is normally cut off. Thus, when an abnormality occurs in one of the third power supply circuit 12c or the fourth power supply circuit 12d, the other can be prevented from being affected by the abnormality. For example, when an overcurrent occurs in one of the third power supply circuit 12c or the fourth power supply circuit 12d, the overcurrent is prevented from flowing to the other.

When the supply of electric power from the first main power source device 14a to the first power supply circuit 12a and the third power supply circuit 12c is cut off, the first power supply circuit 12a and the second power supply circuit 12b are connected by the first connection device 20a and the second connection device 20b. Further, the third power supply circuit 12c and the fourth power supply circuit 12d are connected by the third connection device 20c and the fourth connection device 20d. As a result, electric power is supplied from the second main power source device 14b to the first power supply circuit 12a and the third power supply circuit 12c.

When the supply of electric power from the second main power source device 14b to the second power supply circuit 12b and the fourth power supply circuit 12d is cut off, the first power supply circuit 12a and the second power supply circuit 12b are connected by the first connection device 20a and the second connection device 20b. Further, the third power supply circuit 12c and the fourth power supply circuit 12d are connected by the third connection device 20c and the fourth connection device 20d. As a result, electric power is supplied from the first main power source device 14a to the second power supply circuit 12b and the fourth power supply circuit 12d.

The power supply system 10 includes contactor devices 22a to 22d. The contactor device 22a can disconnect the first main power source device 14a from the first power supply circuit 12a and the first connection circuit 18a. The contactor device 22b can disconnect the second main power source device 14b from the second power supply circuit 12b and the first connection circuit 18a. The contactor device 22c can disconnect the first main power source device 14a from the third power supply circuit 12c and the second connection circuit 18b. The contactor device 22d can disconnect the second main power source device 14b from the fourth power supply circuit 12d and the second connection circuit 18b.

The contactor devices 22a to 22d each include a contactor. The contactor devices 22a to 22d may each include a relay. The contactor devices 22a to 22d may each include a breaker. The contactor devices 22a to 22d may each include a semiconductor switch.

The power supply system 10 includes a first power storage device 24a, a second power storage device 24b, a third power storage device 24c, and a fourth power storage device 24d. The first power storage device 24a is connected to the first power supply circuit 12a in parallel with the first main power source device 14a. The second power storage device 24b is connected to the second power supply circuit 12b in parallel with the second main power source device 14b. The third power storage device 24c is connected to the third power supply circuit 12c in parallel with the first main power source device 14a. The fourth power storage device 24d is connected to the fourth power supply circuit 12d in parallel with the second main power source device 14b.

The first power storage device 24a, the second power storage device 24b, the third power storage device 24c, and the fourth power storage device 24d each include a lithium ion battery. The first power storage device 24a, the second power storage device 24b, the third power storage device 24c, and the fourth power storage device 24d may each include a secondary battery other than the lithium ion battery. The first power storage device 24a, the second power storage device 24b, the third power storage device 24c, and the fourth power storage device 24d may each include a large-capacity capacitor.

The first power storage device 24a, the second power storage device 24b, the third power storage device 24c, and the fourth power storage device 24d may each include various sensors such as a voltage sensor and a current sensor, and elements such as a fuse, a relay, a breaker, a diode, a transistor, a resistor, a coil, and a capacitor.

The power supply system 10 includes contactor devices 26a to 26d. The contactor device 26a can disconnect the first power storage device 24a from the first power supply circuit 12a and the first load device 16a. The contactor device 26b can disconnect the second power storage device 24b from the second power supply circuit 12b and the second load device 16b. The contactor device 26c can disconnect the third power storage device 24c from the third power supply circuit 12c and the third load device 16c. The contactor device 26d can disconnect the fourth power storage device 24d from the fourth power supply circuit 12d and the fourth load device 16d.

The contactor devices 26a to 26d each include a contactor. The contactor devices 26a to 26d may each include a relay. The contactor devices 26a to 26d may each include a breaker. The contactor devices 26a to 26d may each include a semiconductor switch.

The power supply system 10 includes second backflow prevention devices 28a to 28d. The second backflow prevention device 28a restricts the supply of electric power from the first power storage device 24a to the first power supply circuit 12a. The second backflow prevention device 28b restricts the supply of electric power from the second power storage device 24b to the second power supply circuit 12b. The second backflow prevention device 28c restricts the supply of electric power from the third power storage device 24c to the third power supply circuit 12c. The second backflow prevention device 28d restricts the supply of electric power from the fourth power storage device 24d to the fourth power supply circuit 12d.

Figure 4:
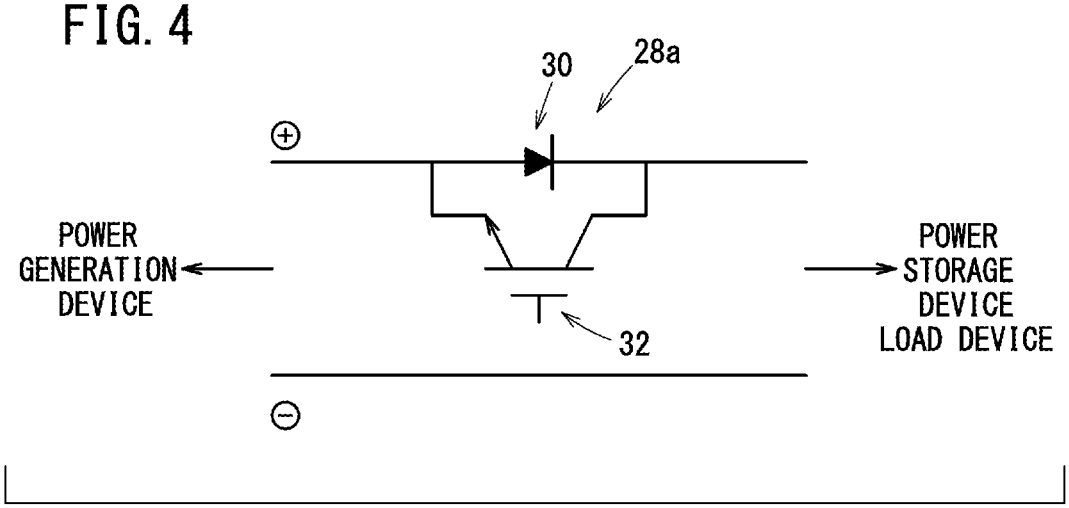
FIG. 4 is a schematic view showing a configuration of a second backflow prevention device.

FIG. 4 is a schematic view showing the configuration of the second backflow prevention device 28a. The second backflow prevention device 28a includes a diode 30 and a transistor 32. The configurations of the second backflow prevention devices 28b to 28d are the same as the configuration of the second backflow prevention device 28a.

The diode 30 is provided on the positive wire. When the anode voltage is lower than the cathode voltage, the diode 30 allows almost no current to flow. When the anode voltage is higher than the cathode voltage and the potential difference between the cathode and the anode is equal to or higher than a forward voltage, the diode 30 allows a current to flow. As a result, electric power is supplied from the first power supply circuit 12a to the first load device 16a and the first power storage device 24a via the diode 30. On the other hand, electric power is not supplied from the first load device 16a and the first power storage device 24a to the first power supply circuit 12a via the diode 30.

The transistor 32 is provided to bypass the diode 30. When a current flows from the base to the emitter of the transistor 32, a current flows from the collector to the emitter. As a result, electric power is supplied from the first load device 16a and the first power storage device 24a to the first power supply circuit 12a via the transistor 32. In a case where the electric power is not supplied from the first load device 16a and the first power storage device 24a to the first power supply circuit 12a, the transistor 32 may be omitted.

Figure 5:
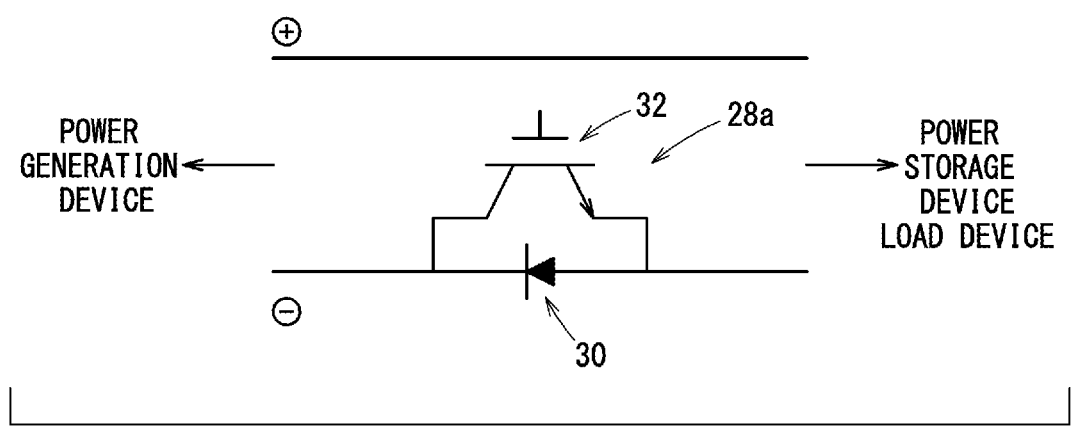
FIG. 5 is a schematic view showing the configuration of the second backflow prevention device.

FIG. 5 is a schematic view showing the configuration of the second backflow prevention device 28a. As shown in FIG. 5, the diode 30 may be provided on the negative wire. Further, the diodes 30 may be provided on both the positive wire and the negative wire.

The power supply system 10 may include various sensors such as a voltage sensor and a current sensor, and elements such as a fuse, a resistor, a coil, and a capacitor, in addition to the above-described configuration.

[Operation of Power Supply System in Normal State]

Figure 6:
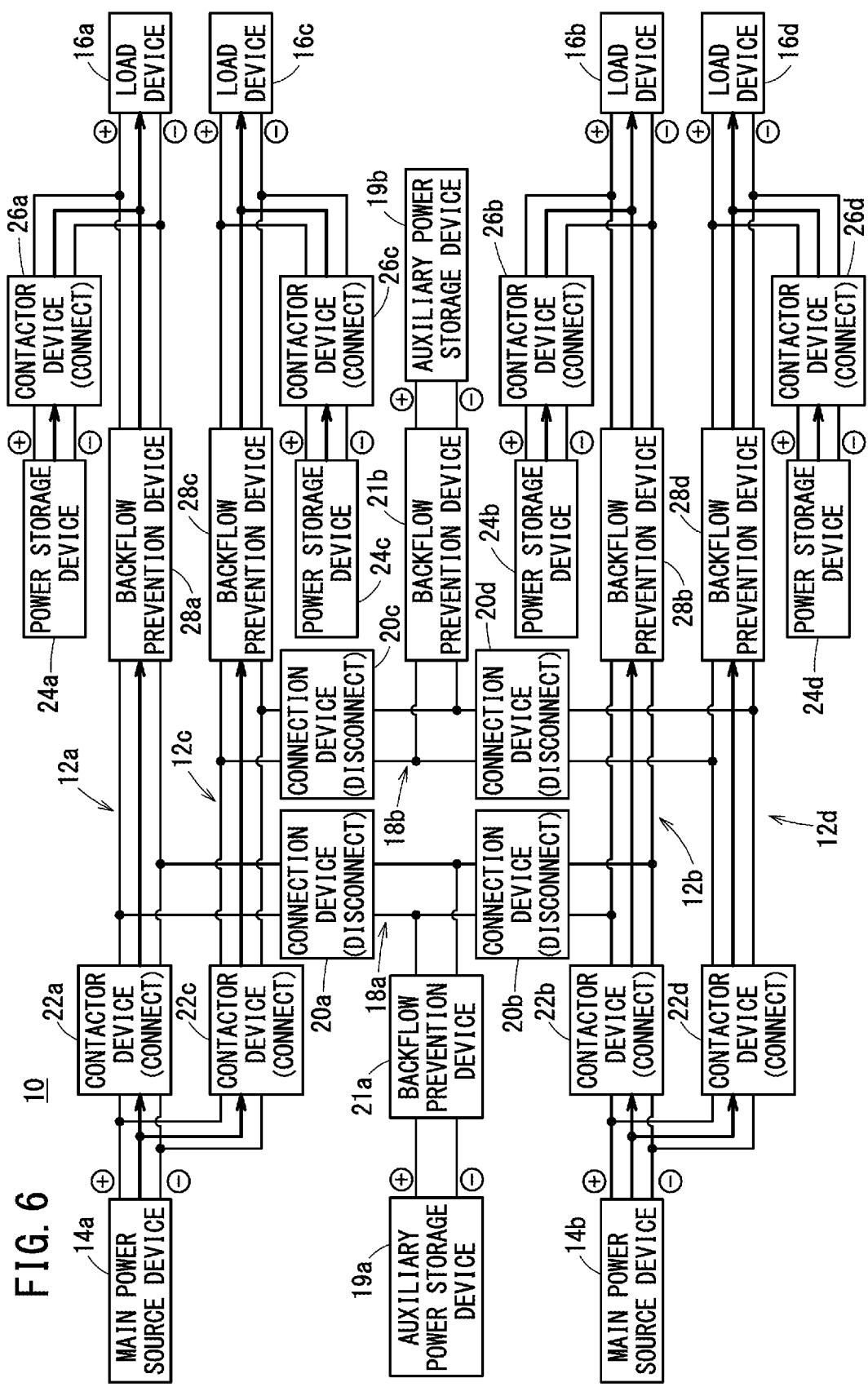
FIG. 6 is a diagram showing the operation of the power supply system in a normal state.

FIG. 6 is a diagram showing the operation of the power supply system 10 in a normal state. Arrows shown in FIG. 6 indicate electric power supply paths.

The first main power source device 14a is connected to the first power supply circuit 12a and the first connection circuit 18a by the contactor device 22a, and the first main power source device 14a is connected to the third power supply circuit 12c and the second connection circuit 18b by the contactor device 22c. As a result, electric power is supplied from the first main power source device 14a to the first load device 16a and the third load device 16c. The second main power source device 14b is connected to the second power supply circuit 12b and the first connection circuit 18a by the contactor device 22b, and the second main power source device 14b is connected to the fourth power supply circuit 12d and the second connection circuit 18b by the contactor device 22d. As a result, electric power is supplied from the second main power source device 14b to the second load device 16b and the fourth load device 16d.

The first power storage device 24a is connected to the first load device 16a by the contactor device 26a, and electric power is supplied from the first power storage device 24a to the first load device 16a. The second power storage device 24b is connected to the second load device 16b by the contactor device 26b, and electric power is supplied from the second power storage device 24b to the second load device 16b. The third power storage device 24c is connected to the third load device 16c by the contactor device 26c, and electric power is supplied from the third power storage device 24c to the third load device 16c. The fourth power storage device 24d is connected to the fourth load device 16d by the contactor device 26d, and electric power is supplied from the fourth power storage device 24d to the fourth load device 16d.

The connection between the first power supply circuit 12a and the second power supply circuit 12b is interrupted by the first connection device 20a and the second connection device 20b, and the connection between the third power supply circuit 12c and the fourth power supply circuit 12d is interrupted by the third connection device 20c and the fourth connection device 20d.

[Operation of Power Supply System in Event of Abnormality]

FIGS. 7 to 11 are diagrams showing the operation of the power supply system 10 in the event of an abnormality. Arrows shown in FIGS. 7 to 11 indicate electric power supply paths. FIGS. 7 to 11 show the operation of the power supply system 10 in a case where the supply of electric power from the first main power source device 14a to the first power supply circuit 12a and the third power supply circuit 12c is cut off.

The state in which the supply of electric power from the first main power source device 14a to the first power supply circuit 12a and the third power supply circuit 12c is cut off is, for example, a state in which the first main power source device 14a is stopped and cannot be restarted, or a state in which a short circuit, a disconnection, or the like has occurred between the first main power source device 14a and the contactor device 22a or between the first main power source device 14a and the contactor device 22c.

Figure 7:
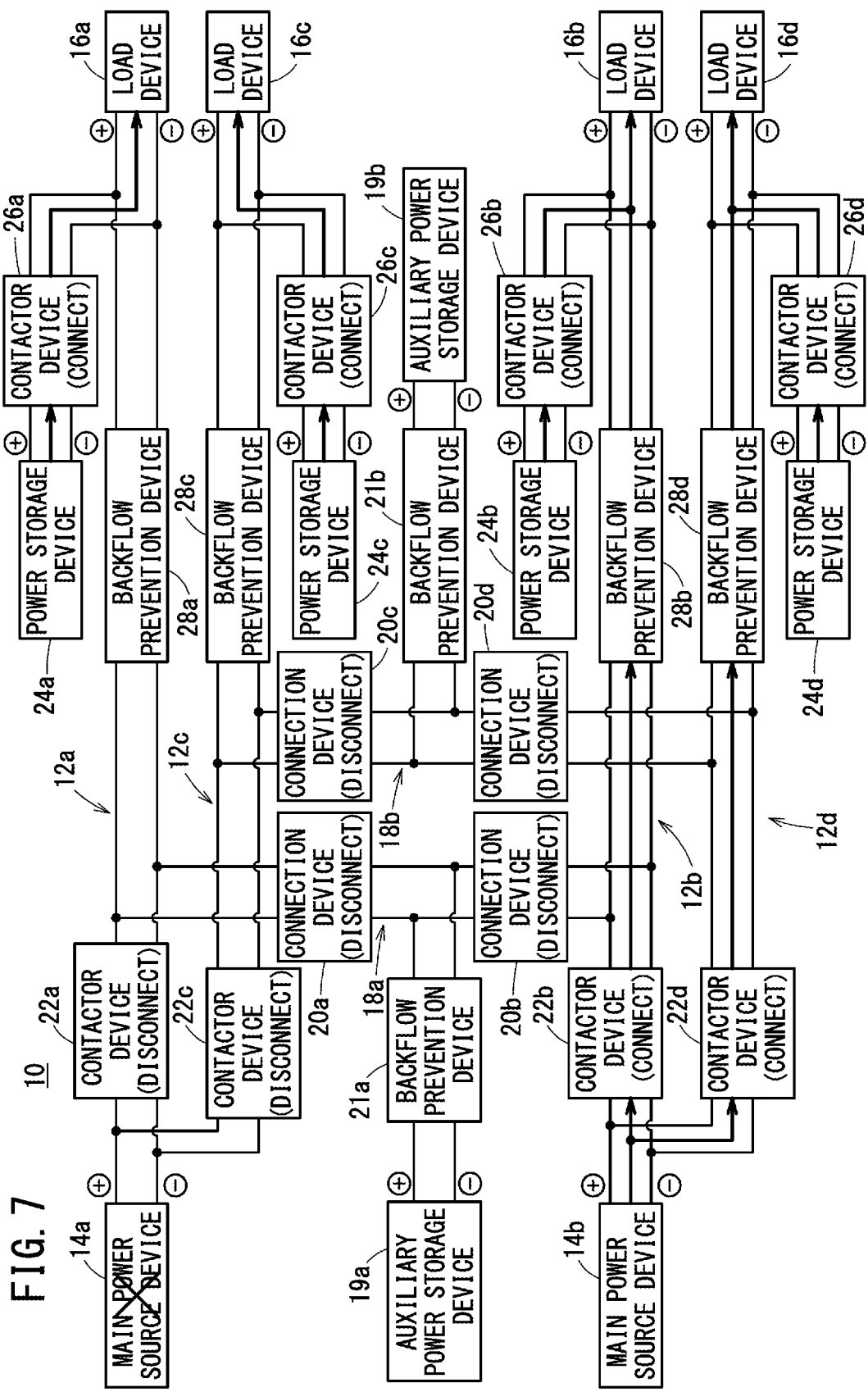
FIG. 7 is a diagram showing the operation of the power supply system in the event of an abnormality.

When the supply of electric power from the first main power source device 14a to the first power supply circuit 12a and the third power supply circuit 12c is cut off, then as shown in FIG. 7, the first main power source device 14a is disconnected from the first power supply circuit 12a and the first connection circuit 18a by the contactor device 22a. Further, the first main power source device 14a is disconnected from the third power supply circuit 12c and the second connection circuit 18b by the contactor device 22c.

The first load device 16a is supplied with electric power only from the first power storage device 24a, and the third load device 16c is supplied with electric power only from the third power storage device 24c. Therefore, the state of charge (SOC) of the first power storage device 24a and the SOC of the third power storage device 24c decrease. Accordingly, the output voltage of the first power storage device 24a and the output voltage of the third power storage device 24c decrease. On the other hand, the second load device 16b is supplied with electric power from the second main power source device 14b and the second power storage device 24b, and the fourth load device 16d is supplied with electric power from the second main power source device 14b and the fourth power storage device 24d. Thus, the SOC of the second power storage device 24b and the SOC of the fourth power storage device 24d hardly decrease. Therefore, the output voltage of the second power storage device 24b and the output voltage of the fourth power storage device 24d hardly decrease. As a result, the output voltage of the first power storage device 24a and the output voltage of the third power storage device 24c become lower than the output voltage of the second power storage device 24b and the output voltage of the fourth power storage device 24d.

When electric power is supplied from the second main power source device 14b to the second load device 16b and the fourth load device 16d, the output voltage of the second main power source device 14b is controlled to be higher than the output voltage of the second power storage device 24b and the output voltage of the fourth power storage device 24d. Therefore, the output voltage of the second main power source device 14b is higher than the output voltage of the first power storage device 24a and the output voltage of the third power storage device 24c.

If the first power supply circuit 12a and the second power supply circuit 12b are connected to each other in this state, an overcurrent flows through the first load device 16a and the first power storage device 24a, and the first load device 16a and the first power storage device 24a may be damaged. Similarly, when the third power supply circuit 12c and the fourth power supply circuit 12d are connected to each other in this state, an overcurrent flows through the third load device 16c and the third power storage device 24c, and the third load device 16c and the third power storage device 24c may be damaged.

In the power supply system 10 of the present embodiment, first voltage reduction control is executed on the second main power source device 14b. The first voltage reduction control is control for approximating the output voltage of the second main power source device 14b to the output voltage of the first power storage device 24a and the output voltage of the third power storage device 24c. The first voltage reduction control is executed until a difference between the output voltage of the second main power source device 14b and the output voltage of the first power storage device 24a, and a difference between the output voltage of the second main power source device 14b and the output voltage of the third power storage device 24c become equal to or less than a predetermined voltage threshold.

Figure 8:
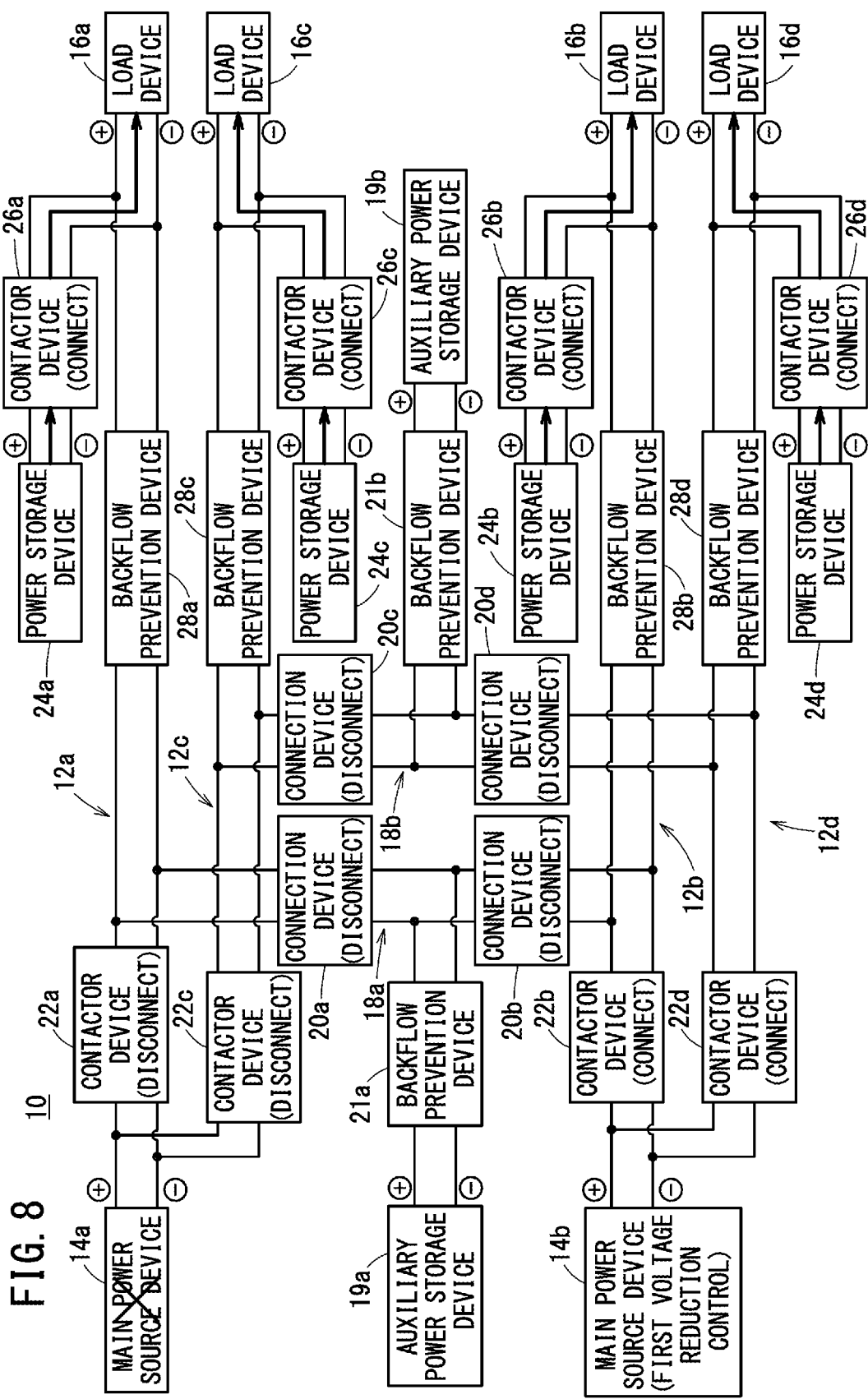
FIG. 8 is a diagram showing the operation of the power supply system in the event of an abnormality.

When the first voltage reduction control is executed on the second main power source device 14b, the output voltage of the second main power source device 14b becomes lower than the output voltage of the second power storage device 24b and the output voltage of the fourth power storage device 24d. Therefore, as shown in FIG. 8, the supply of electric power from the second main power source device 14b to the second load device 16b is restricted by the second backflow prevention device 28b. Further, the supply of electric power from the second main power source device 14b to the fourth load device 16d is restricted by the second backflow prevention device 28d.

Figure 9:
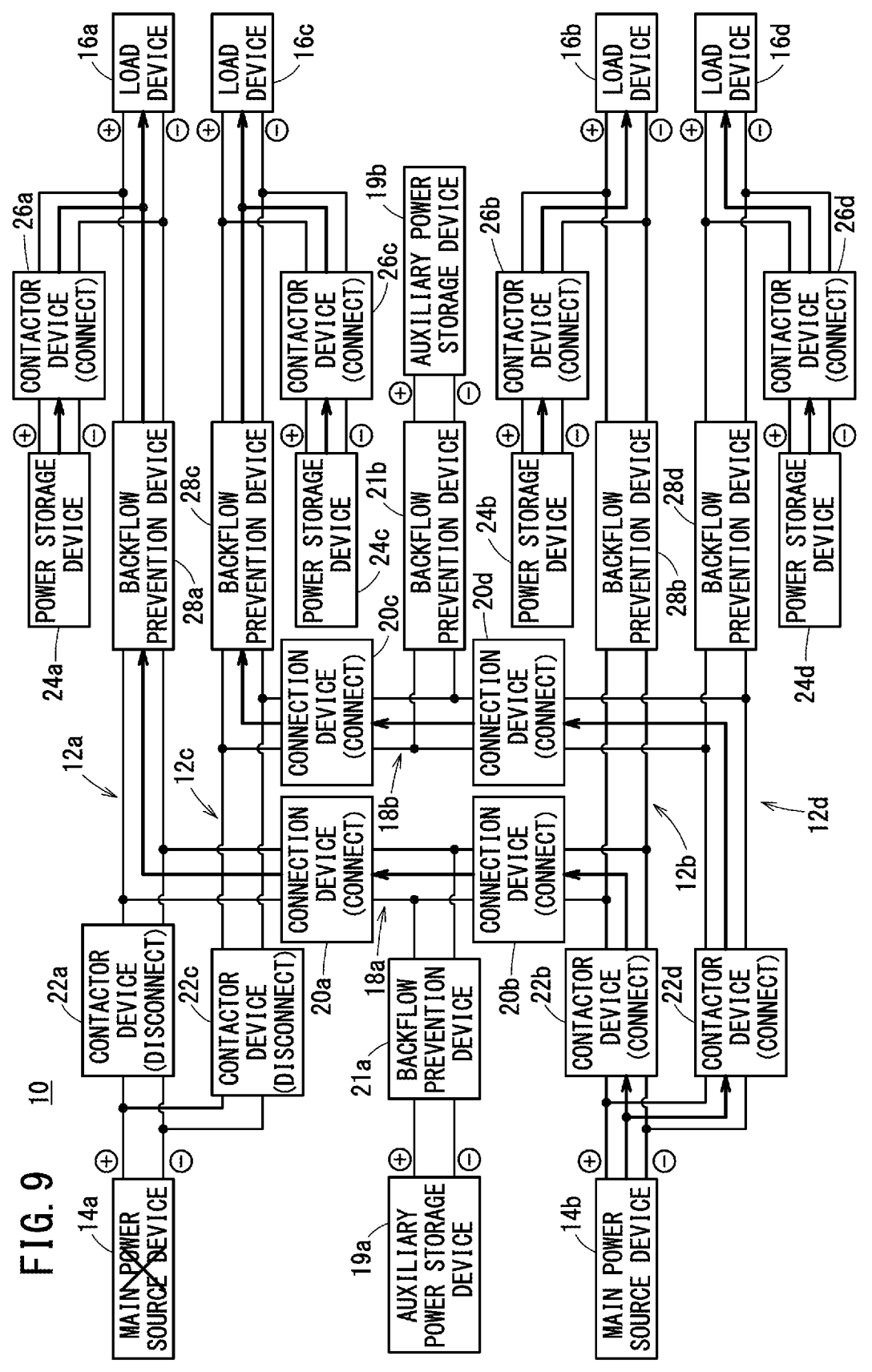

When the difference between the output voltage of the second main power source device 14b and the output voltage of the first power storage device 24a becomes equal to or less than the voltage threshold, first connection control is executed on the first connection device 20a and the second connection device 20b. When the first connection control is executed on the first connection device 20a and the second connection device 20b, then as shown in FIG. 9, the first power supply circuit 12a and the second power supply circuit 12b are connected to each other via the first connection circuit 18a. As a result, electric power is supplied from the second main power source device 14b to the first load device 16a.

Similarly, when the difference between the output voltage of the second main power source device 14b and the output voltage of the third power storage device 24c becomes equal to or less than the voltage threshold, second connection control is executed on the third connection device 20c and the fourth connection device 20d. When the second connection control is executed on the third connection device 20c and the fourth connection device 20d, then as shown in FIG. 9, the third power supply circuit 12c and the fourth power supply circuit 12d are connected to each other via the second connection circuit 18b. As a result, electric power is supplied from the second main power source device 14b to the third load device 16c.

Figure 10:
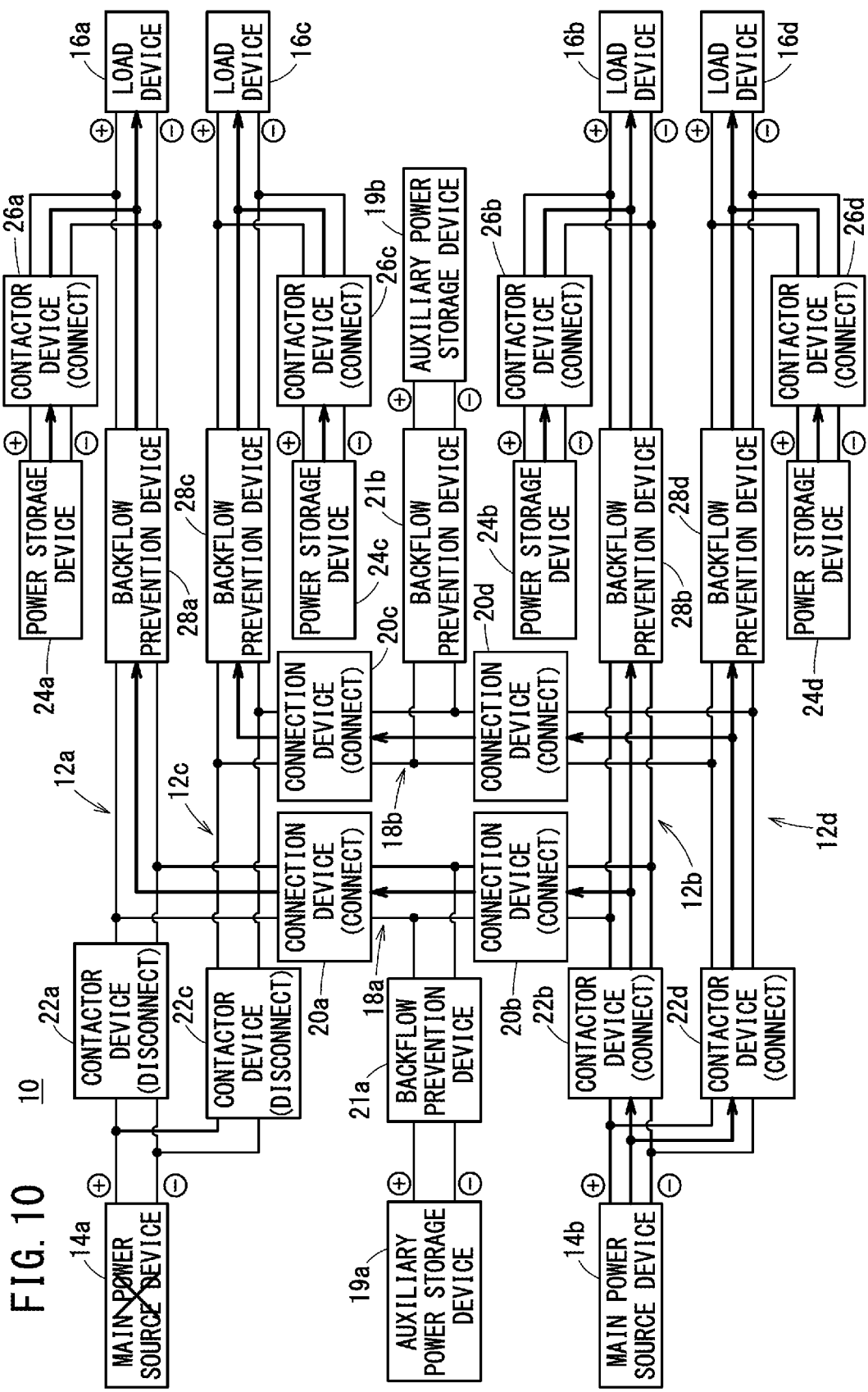
FIG. 10 is a diagram showing the operation of the power supply system in the event of an abnormality.

In the state shown in FIG. 9, the second load device 16b is supplied with electric power only from the second power storage device 24b, and the fourth load device 16d is supplied with electric power only from the fourth power storage device 24d. Therefore, the output voltage of the second power storage device 24b and the output voltage of the fourth power storage device 24d decrease. As a result, the output voltage of the second power storage device 24b and the output voltage of the fourth power storage device 24d become lower than the output voltage of the second main power source device 14b. As a result, as shown in FIG. 10, electric power is supplied from the second main power source device 14b to the second load device 16b and the fourth load device 16d.

Figure 11:
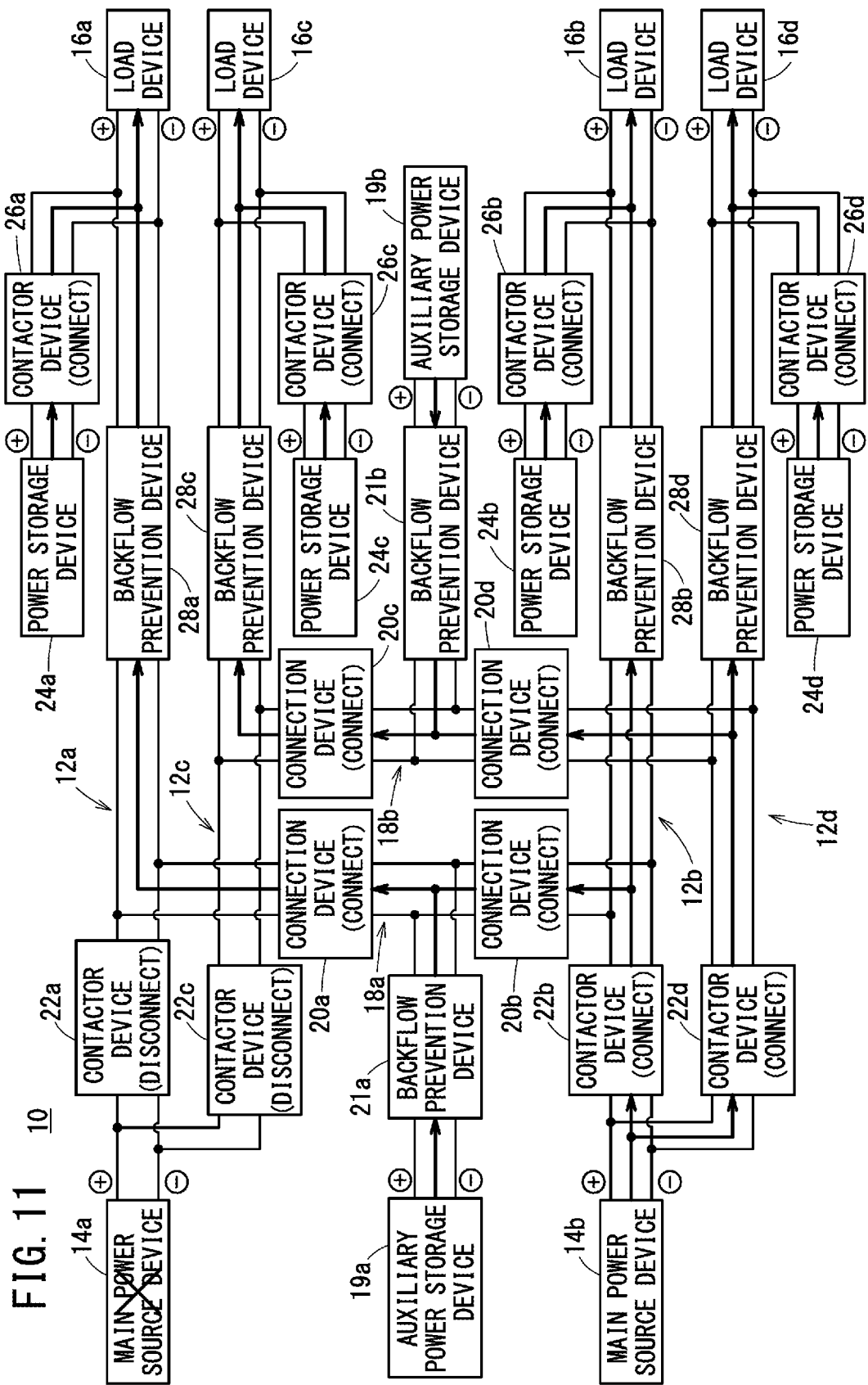
FIG. 11 is a diagram showing the operation of the power supply system in the event of an abnormality.

The output voltage of the second main power source device 14b is controlled in accordance with the output voltage of the first power storage device 24a, the output voltage of the second power storage device 24b, the output voltage of the third power storage device 24c, and the output voltage of the fourth power storage device 24d. When the output voltage of the second main power source device 14b becomes lower than the output voltage of the first auxiliary power storage device 19a, then as shown in FIG. 11, electric power is supplied from the first auxiliary power storage device 19a to the first load device 16a. Similarly, when the output voltage of the second main power source device 14b becomes lower than the output voltage of the second auxiliary power storage device 19b, then as shown in FIG. 11, electric power is supplied from the second auxiliary power storage device 19b to the third load device 16c.

[Configuration of Control Device]

Figure 12:
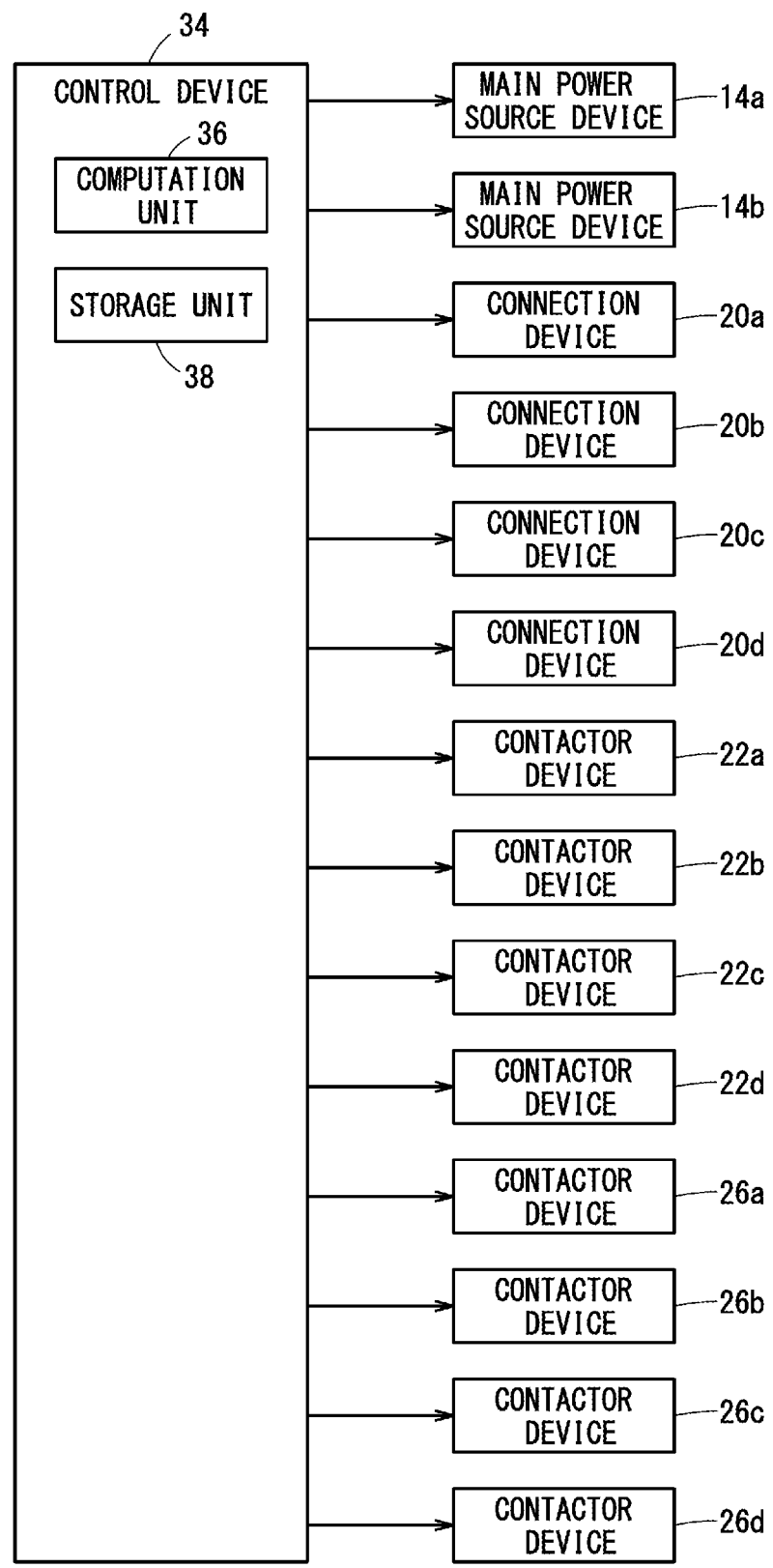
FIG. 12 is a control block diagram of a control device.

The power supply system 10 includes a control device 34. FIG. 12 is a control block diagram of the control device 34. The control device 34 controls the first main power source device 14a, the second main power source device 14b, the first connection device 20a, the second connection device 20b, the third connection device 20c, the fourth connection device 20d, the contactor devices 22a to 22d, and the contactor devices 26a to 26d.

The control device 34 includes a computation unit 36 and a storage unit 38. The computation unit 36 is, for example, a processor such as a central processing unit (CPU) or a graphics processing unit (GPU). The computation unit 36 controls each device by executing a program stored in the storage unit 38. At least part of the computation unit 36 may be realized by an integrated circuit such as an application specific integrated circuit (ASIC) or a field-programmable gate array (FPGA). At least part of the computation unit 36 may be realized by an electronic circuit including a discrete device.

The storage unit 38 is constituted by a volatile memory (not shown) and a non-volatile memory (not shown) which are computer-readable storage media. The volatile memory is, for example, a random access memory (RAM) or the like. The non-volatile memory is, for example, a read only memory (ROM), a flash memory, or the like. Data and the like are stored in, for example, the volatile memory. Programs, tables, maps, and the like are stored in, for example, the non-volatile memory. At least part of the storage unit 38 may be included in the processor, the integrated circuit, or the like described above.

[Fail-Safe Control]

Figure 13:
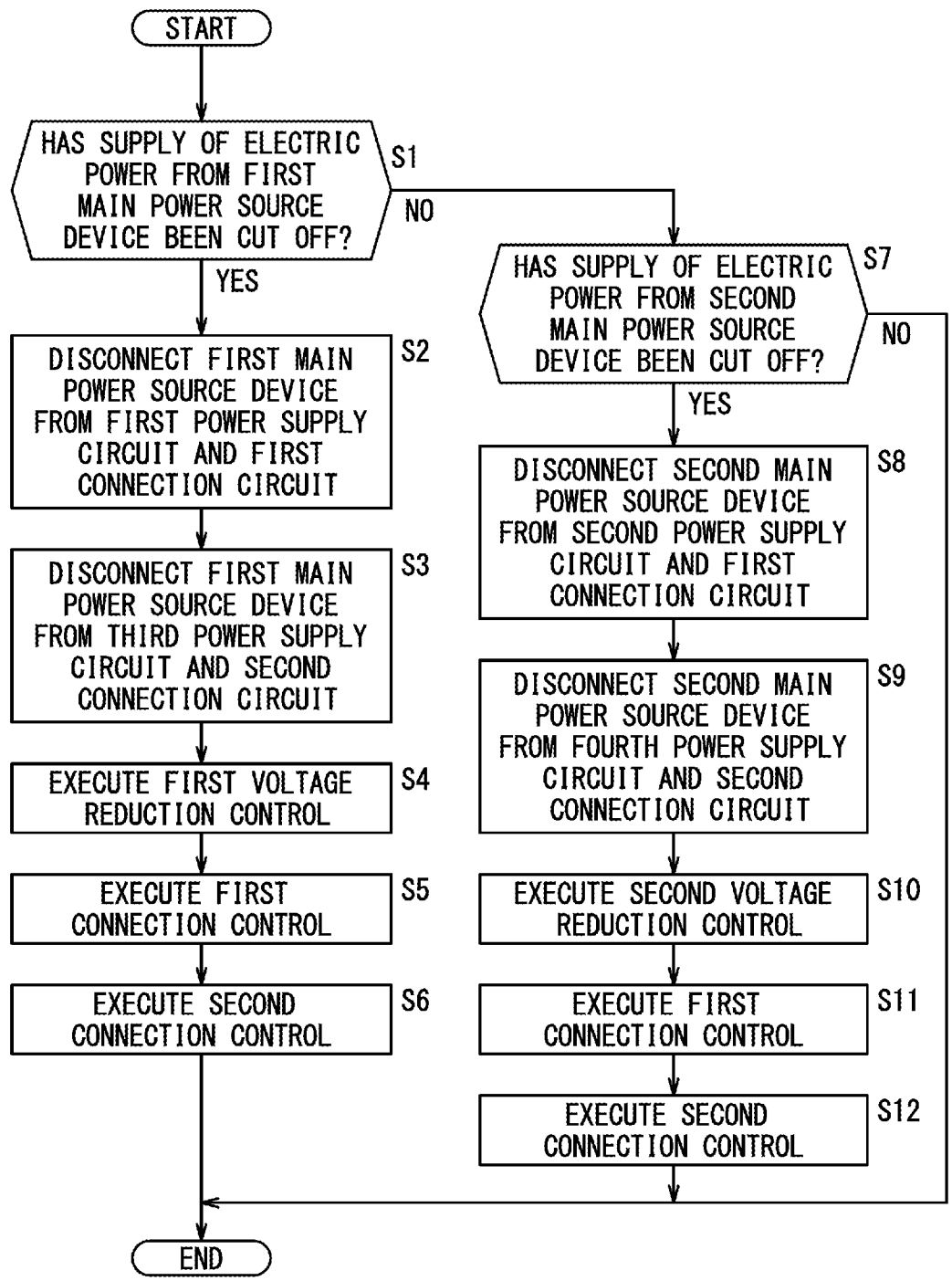
FIG. 13 is a flowchart showing fail-safe control.

FIG. 13 is a flowchart showing fail-safe control. The fail-safe control is repeatedly executed at a predetermined cycle.

In step S1, the control device 34 determines whether or not the supply of electric power from the first main power source device 14a to the first power supply circuit 12a and the third power supply circuit 12c has been cut off. When it is determined that the supply of electric power from the first main power source device 14a to the first power supply circuit 12a and the third power supply circuit 12c has been cut off (step S1: YES), the process proceeds to step S2.

In step S2, the control device 34 controls the contactor device 22a to disconnect the first main power source device 14a from the first power supply circuit 12a and the first connection circuit 18a. Thereafter, the process proceeds to step S3.

In step S3, the control device 34 controls the contactor device 22c to disconnect the first main power source device 14a from the third power supply circuit 12c and the second connection circuit 18b. Thereafter, the process proceeds to step S4.

In step S4, the control device 34 executes the first voltage reduction control on the second main power source device 14b. As a result, the difference between the output voltage of the second main power source device 14b and the output voltage of the first power storage device 24a, and the difference between the output voltage of the second main power source device 14b and the output voltage of the third power storage device 24c, are made equal to or less than the voltage threshold. Thereafter, the process proceeds to step S5.

In step S5, the control device 34 executes the first connection control on the first connection device 20a and the second connection device 20b. As a result, the first power supply circuit 12a and the second power supply circuit 12b are connected to each other via the first connection circuit 18a. Thereafter, the process proceeds to step S6.

In step S6, the control device 34 executes the second connection control on the third connection device 20c and the fourth connection device 20d. As a result, the third power supply circuit 12c and the fourth power supply circuit 12d are connected to each other via the second connection circuit 18b. Thereafter, the fail-safe control is ended.

In step S1, when it is determined that electric power is being supplied from the first main power source device 14a to the first power supply circuit 12a and the third power supply circuit 12c (step S1: NO), the process proceeds to step S7.

In step S7, the control device 34 determines whether or not the supply of electric power from the second main power source device 14b to the second power supply circuit 12b and the fourth power supply circuit 12d has been cut off. When it is determined that the supply of electric power from the second main power source device 14b to the second power supply circuit 12b and the fourth power supply circuit 12d has been cut off (step S7: YES), the process proceeds to step S8. When it is determined that electric power is being supplied from the second main power source device 14b to the second power supply circuit 12b and the fourth power supply circuit 12d (step S7: NO), the fail-safe control is ended.

In step S8, the control device 34 controls the contactor device 22b to disconnect the second main power source device 14b from the second power supply circuit 12b and the first connection circuit 18a. Thereafter, the process proceeds to step S9.

In step S9, the control device 34 controls the contactor device 22d to disconnect the second main power source device 14b from the fourth power supply circuit 12d and the second connection circuit 18b. Thereafter, the process proceeds to step S10.

In step S10, the control device 34 executes second voltage reduction control on the first main power source device 14a. The second voltage reduction control is control for approximating the output voltage of the first main power source device 14a to the output voltage of the second power storage device 24b and the output voltage of the fourth power storage device 24d. As a result, a difference between the output voltage of the first main power source device 14a and the output voltage of the second power storage device 24b, and a difference between the output voltage of the first main power source device 14a and the output voltage of the fourth power storage device 24d, are made equal to or less than the voltage threshold. Thereafter, the process proceeds to step S11.

In step S11, the control device 34 executes the first connection control on the first connection device 20a and the second connection device 20b. As a result, the first power supply circuit 12a and the second power supply circuit 12b are connected to each other via the first connection circuit 18a. Thereafter, the process proceeds to step S12.

In step S12, the control device 34 executes the second connection control on the third connection device 20c and the fourth connection device 20d. As a result, the third power supply circuit 12c and the fourth power supply circuit 12d are connected to each other via the second connection circuit 18b. Thereafter, the fail-safe control is ended.

[Comparison Between Power Supply System of Present Embodiment and Power Supply System of Comparative Example]

Figure 14:
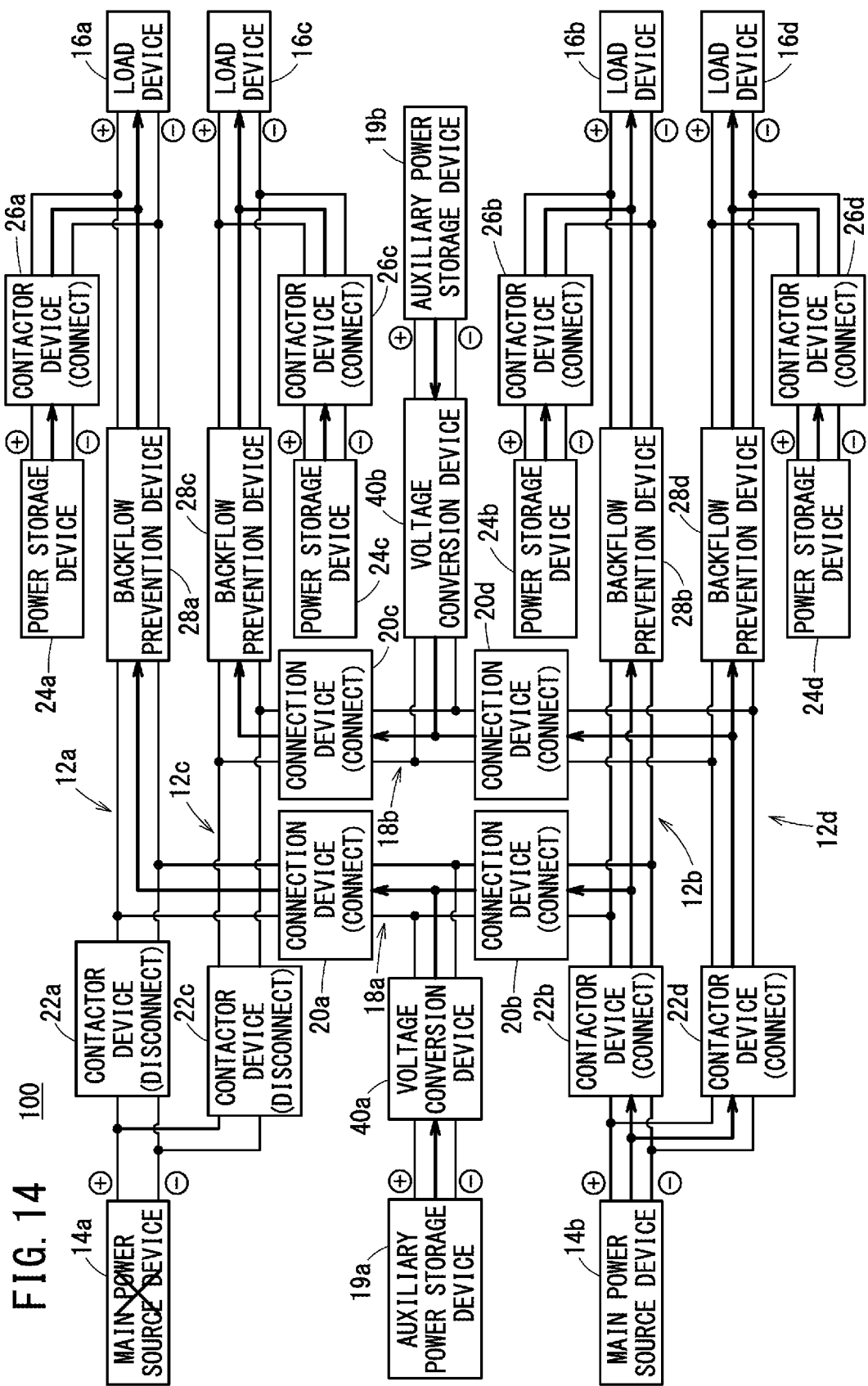
FIG. 14 is a schematic view of a power supply system.

FIG. 14 is a schematic view of a power supply system 100 of a comparative example. The power supply system 100 includes voltage conversion devices 40a and 40b. The voltage conversion devices 40a and 40b are DC/DC converters.

When the first power supply circuit 12a and the second power supply circuit 12b are connected to each other by the first connection device 20a and the second connection device 20b, the power supply system 100 makes the output voltage of the voltage conversion device 40a higher than the output voltage of the second main power source device 14b. As a result, electric power can be supplied from the second main power source device 14b and the first auxiliary power storage device 19a to the first load device 16a via the first connection circuit 18a.

Further, when the third power supply circuit 12c and the fourth power supply circuit 12d are connected to each other by the third connection device 20c and the fourth connection device 20d, the power supply system 100 makes the output voltage of the voltage conversion device 40b higher than the output voltage of the second main power source device 14b. As a result, electric power can be supplied from the second main power source device 14b and the second auxiliary power storage device 19b to the third load device 16c via the second connection circuit 18b.

However, the voltage conversion devices 40a and 40b are heavier than the first backflow prevention devices 21a and 21b. Accordingly, the power supply system 10 of the present embodiment can be reduced in weight by including the first backflow prevention devices 21a and 21b.

[Reduction in Capacities of Power Storage Devices]

The power supply system 10 of the present embodiment includes the first auxiliary power storage device 19a and the second auxiliary power storage device 19b, in addition to the first power storage device 24a, the second power storage device 24b, the third power storage device 24c, and the fourth power storage device 24d.

The first power storage device 24a supplies electric power to the first load device 16a, and the second power storage device 24b supplies electric power to the second load device 16b, whereas the first auxiliary power storage device 19a can supply electric power to both the first load device 16a and the second load device 16b. Further, the third power storage device 24c supplies electric power to the third load device 16c, and the fourth power storage device 24d supplies electric power to the fourth load device 16d, whereas the second auxiliary power storage device 19b can supply electric power to both the third load device 16c and the fourth load device 16d.

Figure 15:
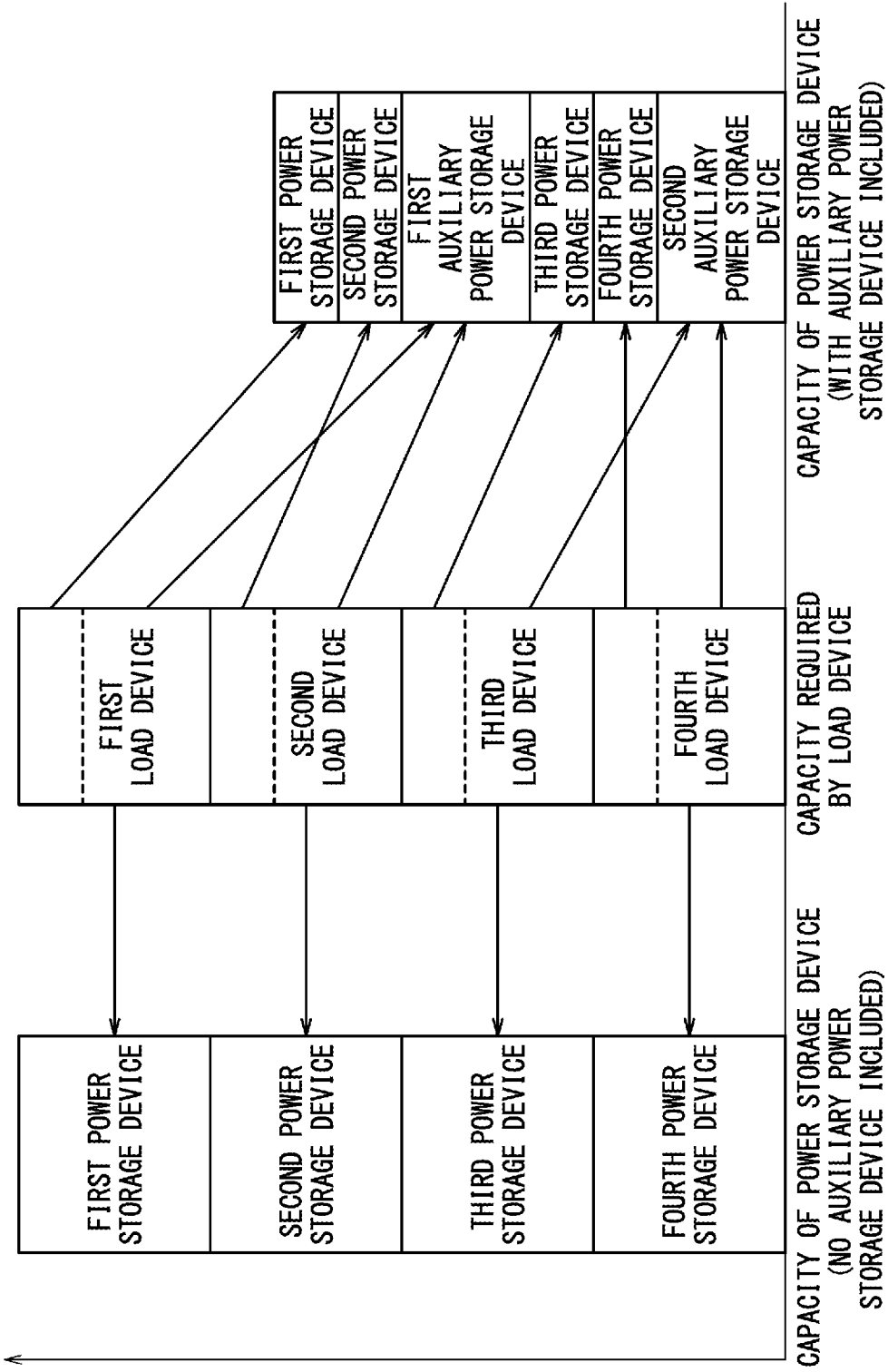
FIG. 15 is an image diagram of the capacities of power storage devices.

FIG. 15 is an image diagram of the capacities of the power storage devices. FIG. 15 shows the capacities of the power storage devices when the power supply system 10 includes the first auxiliary power storage device 19a and the second auxiliary power storage device 19b, and the capacities of the power storage devices when the power supply system 10 does not include the first auxiliary power storage device 19a and the second auxiliary power storage device 19b.

For example, there is a case where, when a short circuit occurs between the contactor device 22a and the first load device 16a (namely, in the first power supply circuit 12a), the contactor device 22a and the contactor device 26a are brought into an interruption state to stop supplying electric power to the first load device 16a, thereby protecting the entire circuits of the power supply system 10. In this case, the energy of the first power storage device 24a becomes unavailable, and it means that energy of one power storage device is lost in the power supply system 10.

If the power supply system 10 does not include the first auxiliary power storage device 19a and the second auxiliary power storage device 19b, then as described above, in preparation for a situation in which energy of one power storage device is lost, the remaining three power storage devices need to have additional energy (=capacities) corresponding to the lost energy.

In the power supply system 10 of the present embodiment, as shown in FIG. 15, part of the capacity of the power storage device required by the first load device 16a and part of the capacity of the power storage device required by the second load device 16b are provided by the first auxiliary power storage device 19a. Each of the capacity of the first power storage device 24a and the capacity of the second power storage device 24b can be reduced in an amount corresponding to the capacity provided by the first auxiliary power storage device 19a.

Similarly, in the power supply system 10 of the present embodiment, as shown in FIG. 15, part of the capacity of the power storage device required by the third load device 16c and part of the capacity of the power storage device required by the fourth load device 16d are provided by the second auxiliary power storage device 19b. Each of the capacity of the third power storage device 24c and the capacity of the fourth power storage device 24d can be reduced in an amount corresponding to the capacity provided by the second auxiliary power storage device 19b.

If the first auxiliary power storage device 19a is not present, the entire capacity required by the first load device 16a needs to be provided by the first power storage device 24a, and the entire capacity required by the second load device 16b needs to be provided by the second power storage device 24b. Similarly, if the second auxiliary power storage device 19b is not present, the entire capacity required by the third load device 16c needs to be provided by the third power storage device 24c, and the entire capacity required by the fourth load device 16d needs to be provided by the fourth power storage device 24d.

Therefore, the sum of the capacities of the power storage devices in a case where the power supply system 10 includes the first auxiliary power storage device 19a and the second auxiliary power storage device 19b can be made smaller than the sum of the capacities of the power storage devices in a case where the power supply system 10 does not include the first auxiliary power storage device 19a and the second auxiliary power storage device 19b.

Second Embodiment

The configuration of the power supply system 10 of the present embodiment is the same as the configuration of the power supply system 10 of the first embodiment. The fail-safe control executed by the control device 34 of the present embodiment is partially different from the fail-safe control executed by the control device 34 of the first embodiment.

[Operation of Power Supply System in Event of Abnormality]

FIGS. 16 to 20 are diagrams showing the operation of the power supply system 10 in the event of an abnormality. Arrows shown in FIGS. 16 to 20 indicate electric power supply paths. FIGS. 16 to 20 show the operation of the power supply system 10 in a case where the supply of electric power from the first main power source device 14a to the first load device 16a is stopped.

The state in which the supply of electric power from the first main power source device 14a to the first load device 16a is stopped is, for example, a state in which the first load device 16a is stopped and cannot be restarted, or a state in which a short circuit, disconnection, or the like has occurred between the contactor device 22a and the first load device 16a.

Figure 16:
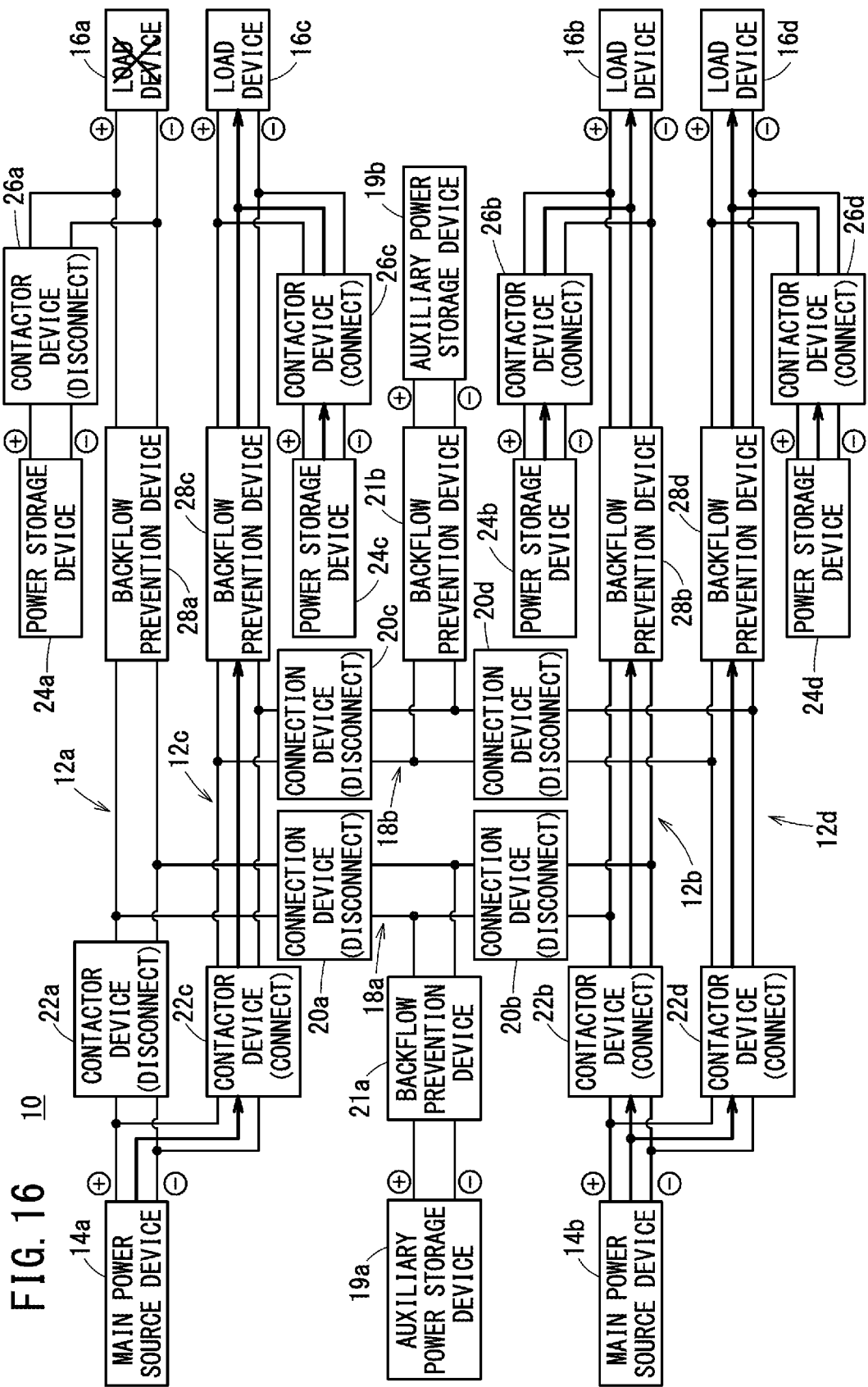
FIG. 16 is a diagram showing the operation of the power supply system in the event of an abnormality.

In this case, as shown in FIG. 16, the first main power source device 14a is disconnected from the first power supply circuit 12a and the first connection circuit 18a by the contactor device 22a.

The first main power source device 14a supplies electric power only to the third load device 16c. On the other hand, the second main power source device 14b supplies electric power to both the second load device 16b and the fourth load device 16d. Therefore, the SOC of the second power storage device 24b and the SOC of the fourth power storage device 24d become lower than the SOC of the third power storage device 24c. As a result, the output voltage of the second power storage device 24b and the output voltage of the fourth power storage device 24d become lower than the output voltage of the third power storage device 24c.

In a case where electric power is supplied from the first main power source device 14a to the third load device 16c, the output voltage of the first main power source device 14a is controlled to be higher than the output voltage of the third load device 16c. Therefore, the output voltage of the first main power source device 14a is higher than the output voltage of the second power storage device 24b and the output voltage of the fourth power storage device 24d.

If the third power supply circuit 12c and the fourth power supply circuit 12d are connected to each other in this state, an overcurrent may flow through the second main power source device 14b, the second load device 16b, the second power storage device 24b, the fourth load device 16d, and the fourth power storage device 24d. Therefore, the second main power source device 14b, the second load device 16b, the second power storage device 24b, the fourth load device 16d, and the fourth power storage device 24d may be damaged.

In the power supply system 10 of the present embodiment, the second voltage reduction control is executed on the first main power source device 14a. The second voltage reduction control is control for approximating the output voltage of the first main power source device 14a to the output voltage of the second power storage device 24b and the output voltage of the fourth power storage device 24d. The second voltage reduction control is executed until the difference between the output voltage of the first main power source device 14a and the output voltage of the second power storage device 24b, and the difference between the output voltage of the first main power source device 14a and the output voltage of the fourth power storage device 24d become equal to or less than a predetermined voltage threshold.

Figure 17:
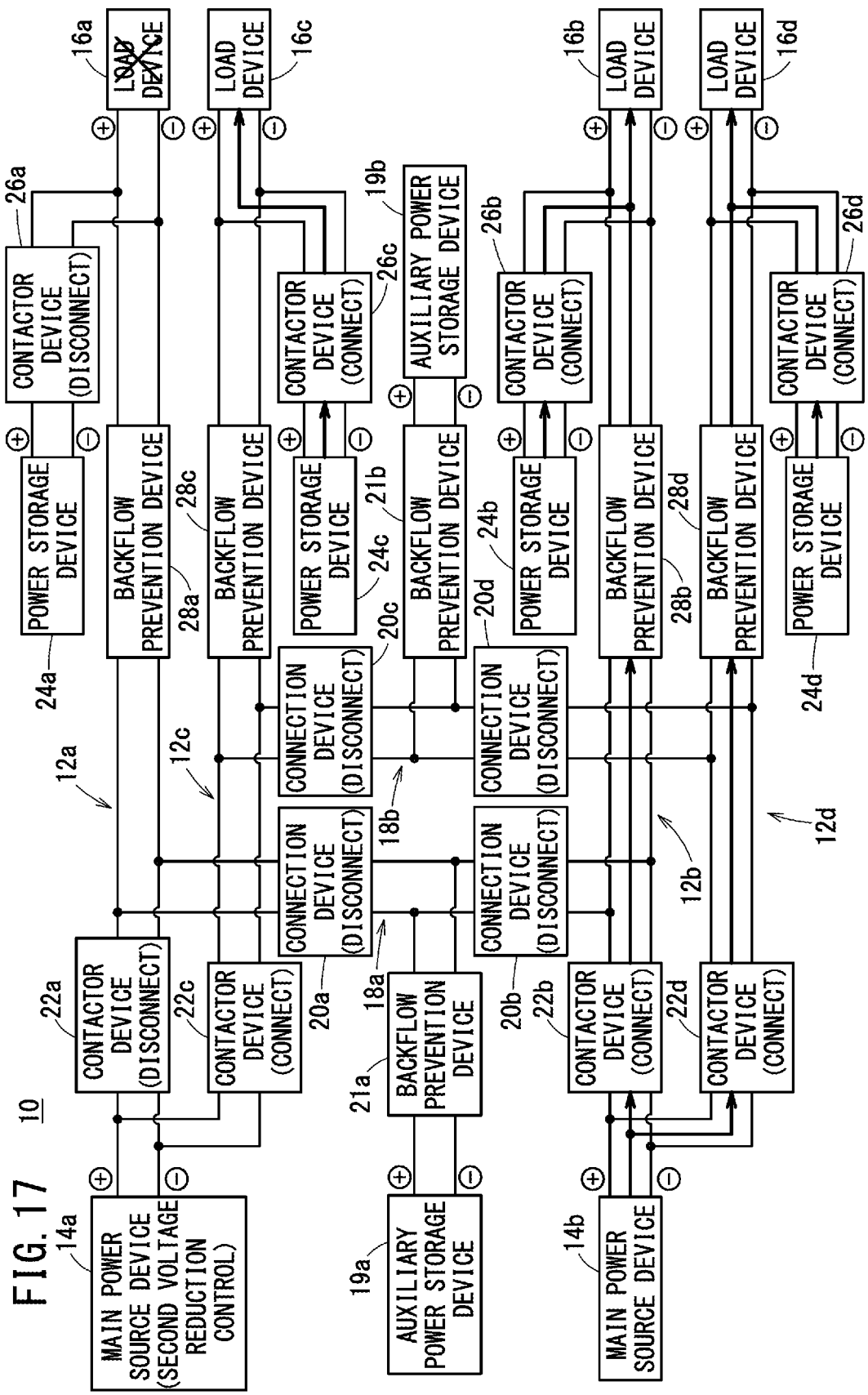
FIG. 17 is a diagram showing the operation of the power supply system in the event of an abnormality.

When the second voltage reduction control is executed on the first main power source device 14a, the output voltage of the first main power source device 14a becomes lower than the output voltage of the third power storage device 24c. Therefore, as shown in FIG. 17, the supply of electric power from the first main power source device 14a to the third load device 16c is restricted by the second backflow prevention device 28c.

Figure 18:
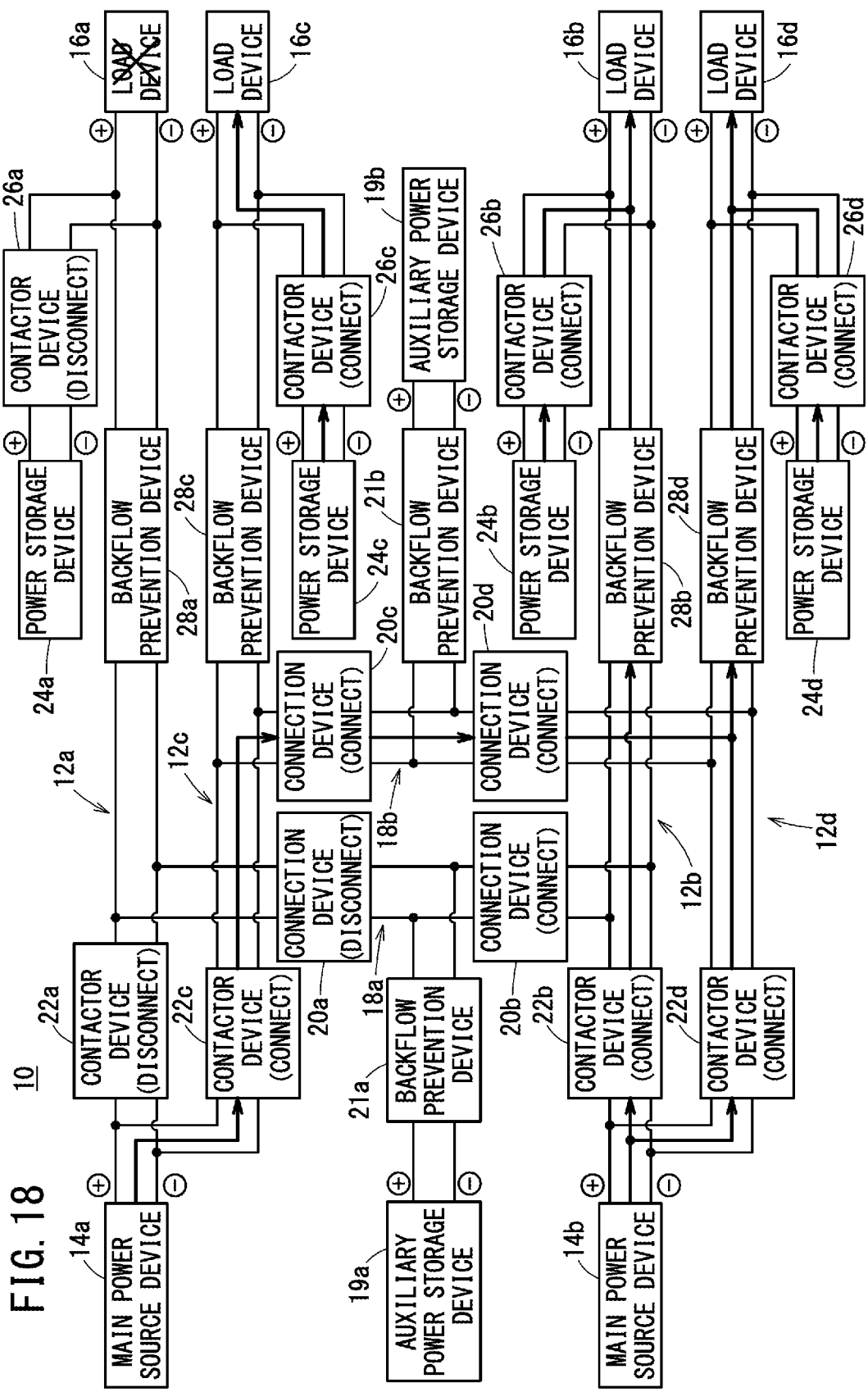
FIG. 18 is a diagram showing the operation of the power supply system in the event of an abnormality.

When the difference between the output voltage of the first main power source device 14a and the output voltage of the fourth power storage device 24d becomes equal to or less than the voltage threshold, then as shown in FIG. 18, the third power supply circuit 12c and the fourth power supply circuit 12d are connected to each other by the third connection device 20c and the fourth connection device 20d. As a result, electric power is supplied from the first main power source device 14a to the second load device 16b and the fourth load device 16d.

When the difference between the output voltage of the first main power source device 14a and the output voltage of the fourth power storage device 24d becomes equal to or less than the voltage threshold, then as shown in FIG. 18, the first auxiliary power storage device 19a and the second power supply circuit 12b are connected to each other by the second connection device 20b. However, as shown in FIG. 18, the supply of electric power from the second main power source device 14b to the first auxiliary power storage device 19a is restricted by the first backflow prevention device 21a.

In the state shown in FIG. 18, the third load device 16c is supplied with electric power only from the third power storage device 24c. As a result, the SOC of the third power storage device 24c decreases, and the output voltage of the third power storage device 24c decreases.

Figure 19:
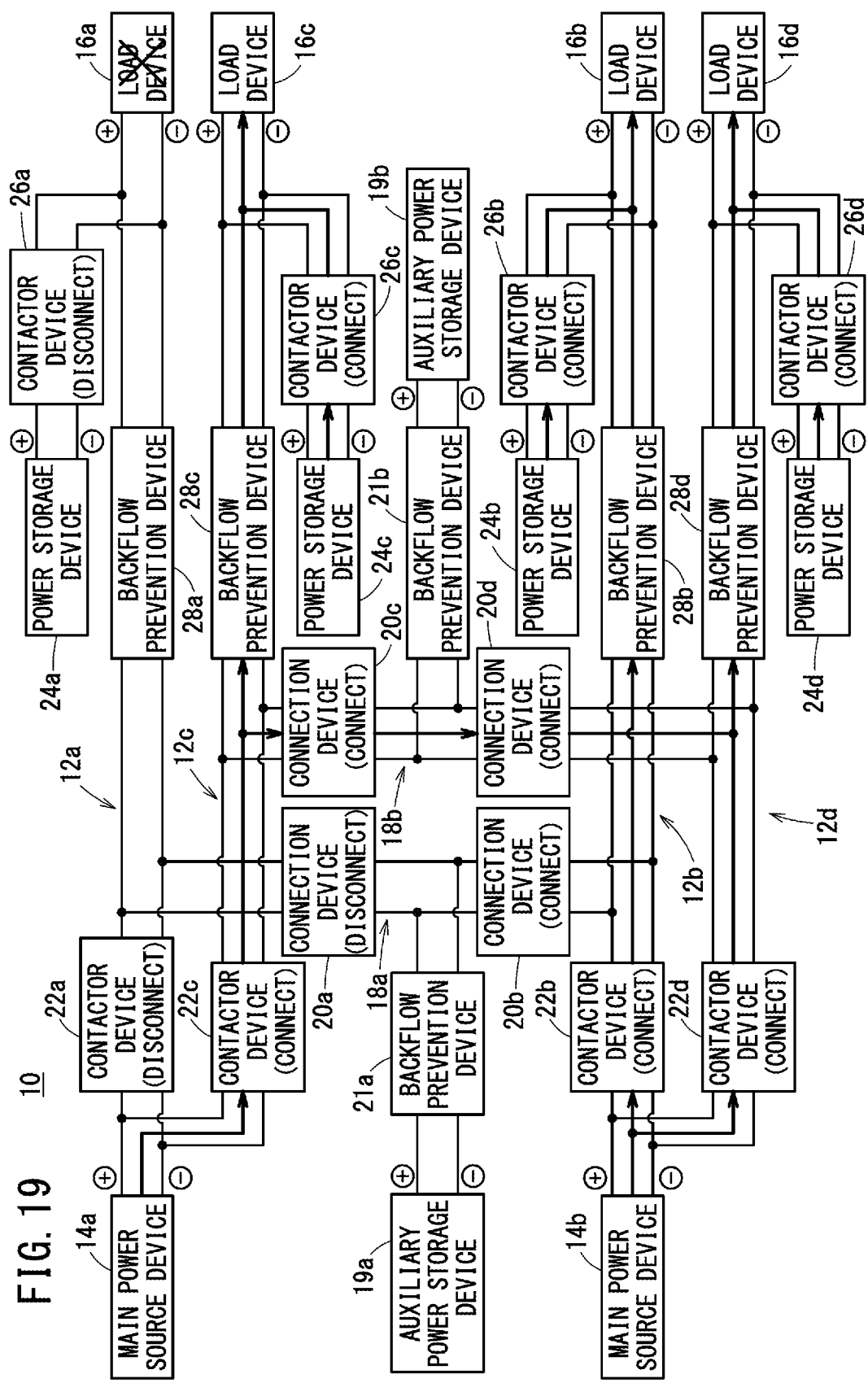
FIG. 19 is a diagram showing the operation of the power supply system in the event of an abnormality.

When the output voltage of the third power storage device 24c becomes lower than the output voltage of the first main power source device 14a, then as shown in FIG. 19, electric power is supplied from the first main power source device 14a to the third load device 16c.

The output voltage of the first main power source device 14a and the output voltage of the second main power source device 14b are controlled in accordance with the output voltage of the second power storage device 24b, the output voltage of the third power storage device 24c, and the output voltage of the fourth power storage device 24d. When the output voltage of the first main power source device 14a and the output voltage of the second main power source device 14b become lower than the output voltage of the first auxiliary power storage device 19a, then as shown in FIG. 20, electric power is supplied from the first auxiliary power storage device 19a to the second load device 16b and the fourth load device 16d.

Figure 20:
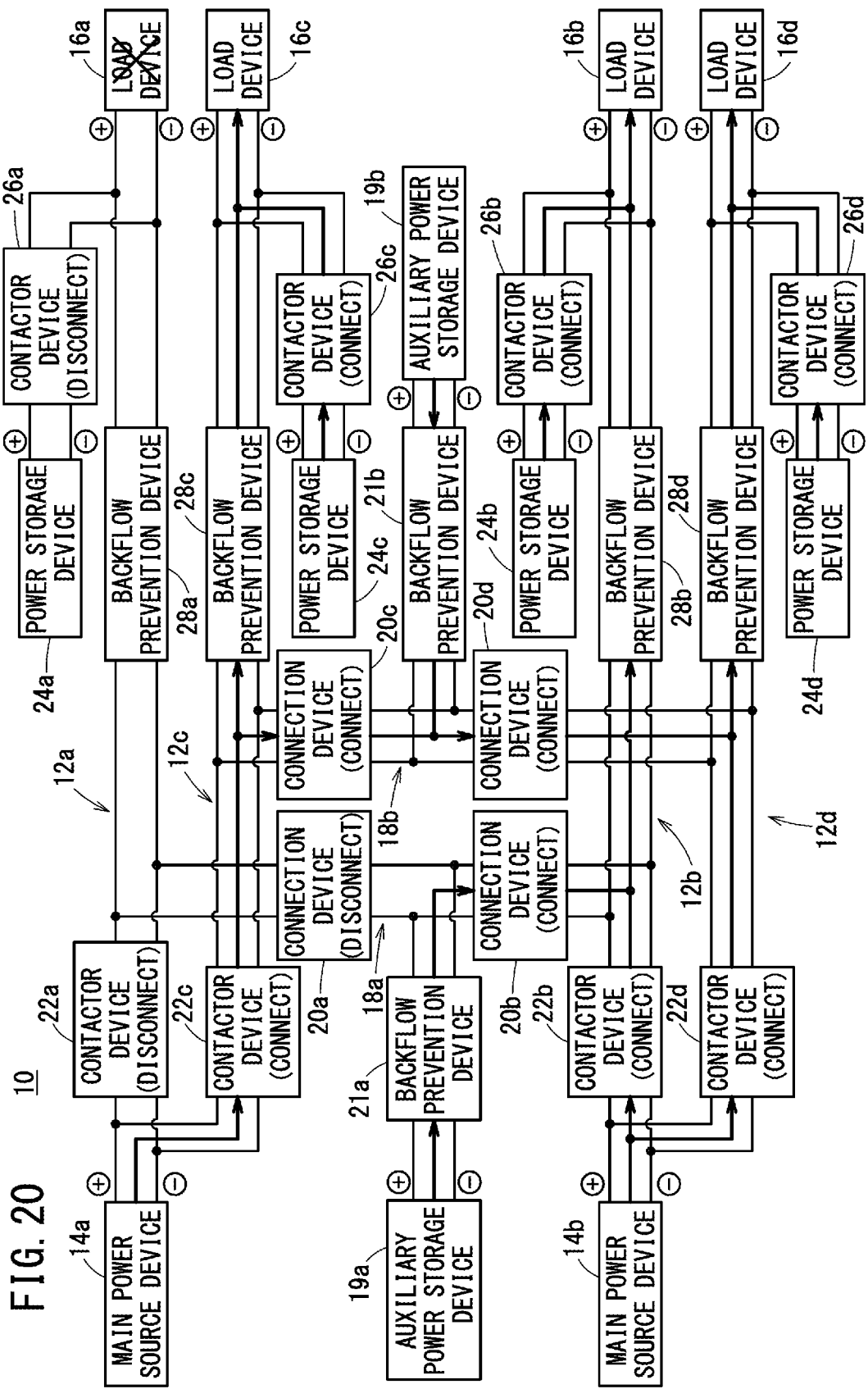
FIG. 20 is a diagram showing the operation of the power supply system in the event of an abnormality.

Similarly, when the output voltage of the first main power source device 14a and the output voltage of the second main power source device 14b become lower than the output voltage of the second auxiliary power storage device 19b, then as shown in FIG. 20, electric power is supplied from the second auxiliary power storage device 19b to the second load device 16b and the fourth load device 16d.

[Fail-Safe Control]

Figure 21:
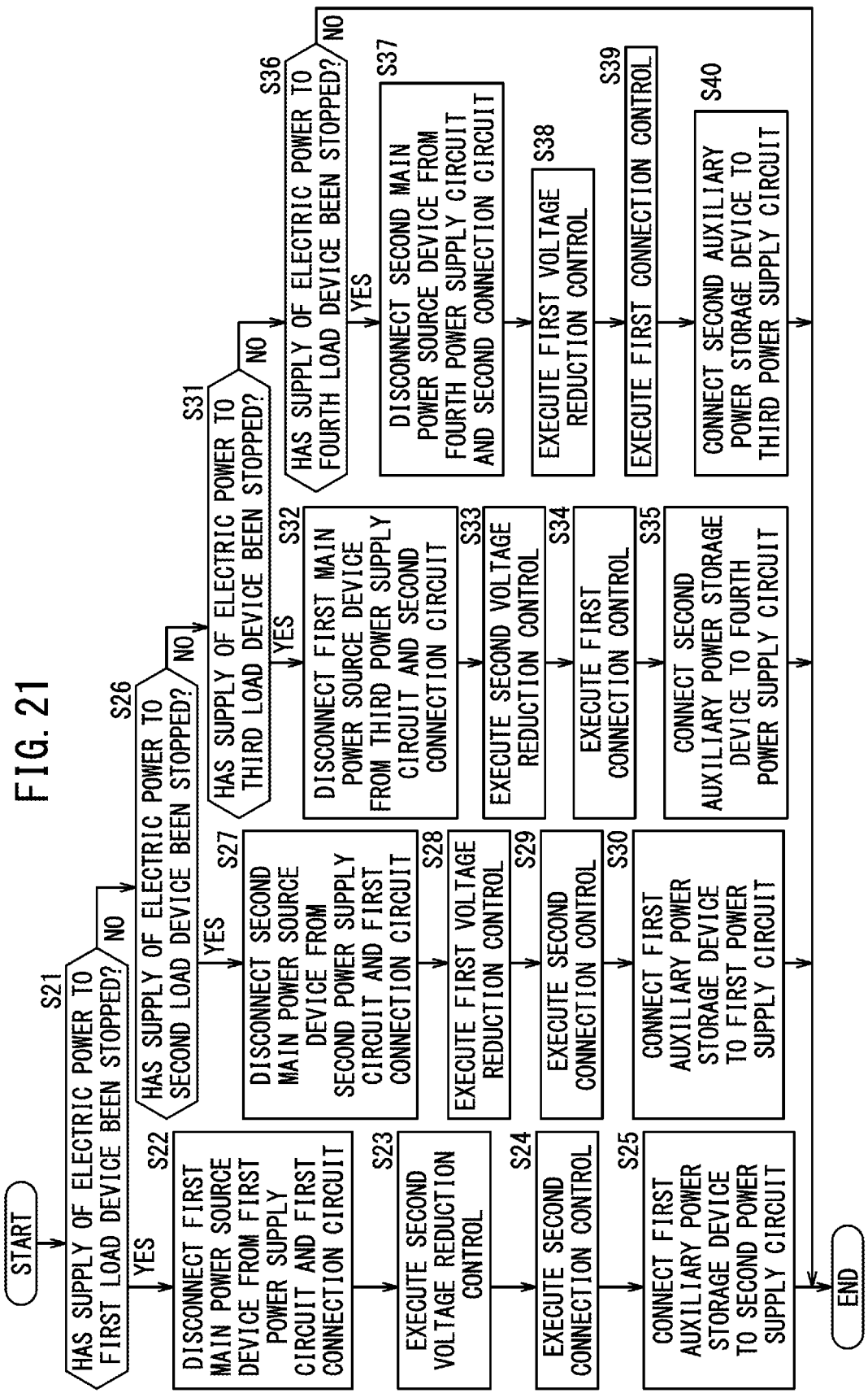
FIG. 21 is a flowchart showing the fail-safe control.

FIG. 21 is a flowchart showing the fail-safe control. The fail-safe control is repeatedly executed at a predetermined cycle.

In step S21, the control device 34 determines whether or not the supply of electric power from the first main power source device 14a to the first load device 16a has been stopped. When it is determined that the supply of electric power from the first main power source device 14a to the first load device 16a has been stopped (step S21: YES), the process proceeds to step S22.

In step S22, the control device 34 controls the contactor device 22a to disconnect the first main power source device 14a from the first power supply circuit 12a and the first connection circuit 18a. Thereafter, the process proceeds to step S23.

In step S23, the control device 34 executes the second voltage reduction control on the first main power source device 14a. As a result, the difference between the output voltage of the first main power source device 14a and the output voltage of the second power storage device 24b, and the difference between the output voltage of the first main power source device 14a and the output voltage of the fourth power storage device 24d, are made equal to or less than the voltage threshold. Thereafter, the process proceeds to step S24.

In step S24, the control device 34 executes the second connection control on the third connection device 20c and the fourth connection device 20d. As a result, the third power supply circuit 12c and the fourth power supply circuit 12d are connected to each other via the second connection circuit 18b. Thereafter, the process proceeds to step S25.

In step S25, the control device 34 controls the second connection device 20b to connect the first auxiliary power storage device 19a to the second power supply circuit 12b. Thereafter, the fail-safe control is ended.

In step S21, when it is determined that electric power is being supplied from the first main power source device 14a to the first load device 16a (step S21: NO), the process proceeds to step S26.

In step S26, the control device 34 determines whether or not the supply of electric power from the second main power source device 14b to the second load device 16b has been stopped. When it is determined that the supply of electric power from the second main power source device 14b to the second load device 16b has been stopped (step S26: YES), the process proceeds to step S27.

In step S27, the control device 34 controls the contactor device 22b to disconnect the second main power source device 14b from the second power supply circuit 12b and the first connection circuit 18a. Thereafter, the process proceeds to step S28.

In step S28, the control device 34 executes the first voltage reduction control on the second main power source device 14b. As a result, the difference between the output voltage of the second main power source device 14b and the output voltage of the first power storage device 24a, and the difference between the output voltage of the second main power source device 14b and the output voltage of the third power storage device 24c, are made equal to or less than the voltage threshold. Thereafter, the process proceeds to step S29.

In step S29, the control device 34 executes the second connection control on the third connection device 20c and the fourth connection device 20d. As a result, the third power supply circuit 12c and the fourth power supply circuit 12d are connected to each other via the second connection circuit 18b. Thereafter, the process proceeds to step S30.

In step S30, the control device 34 controls the first connection device 20a to connect the first auxiliary power storage device 19a to the first power supply circuit 12a. Thereafter, the fail-safe control is ended.

In step S26, when it is determined that electric power is being supplied from the second main power source device 14b to the second load device 16b (step S26: NO), the process proceeds to step S31.

In step S31, the control device 34 determines whether or not the supply of electric power from the first main power source device 14a to the third load device 16c has been stopped. When it is determined that the supply of electric power from the first main power source device 14a to the third load device 16c has been stopped (step S31: YES), the process proceeds to step S32.

In step S32, the control device 34 controls the contactor device 22c to disconnect the first main power source device 14a from the third power supply circuit 12c and the second connection circuit 18b. Thereafter, the process proceeds to step S33.

In step S33, the control device 34 executes the second voltage reduction control on the first main power source device 14a. As a result, the difference between the output voltage of the first main power source device 14a and the output voltage of the second power storage device 24b, and the difference between the output voltage of the first main power source device 14a and the output voltage of the fourth power storage device 24d, are made equal to or less than the voltage threshold. Thereafter, the process proceeds to step S34.

In step S34, the control device 34 executes the first connection control on the first connection device 20a and the second connection device 20b. As a result, the first power supply circuit 12a and the second power supply circuit 12b are connected to each other via the first connection circuit 18a. Thereafter, the process proceeds to step S35.

In step S35, the control device 34 controls the fourth connection device 20d to connect the second auxiliary power storage device 19b to the fourth power supply circuit 12d. Thereafter, the fail-safe control is ended.

In step S31, when it is determined that electric power is being supplied from the first main power source device 14a to the third load device 16c (step S31: NO), the process proceeds to step S36.

In step S36, the control device 34 determines whether or not the supply of electric power from the second main power source device 14b to the fourth load device 16d has been stopped. When it is determined that the supply of electric power from the second main power source device 14b to the fourth load device 16d has been stopped (step S36: YES), the process proceeds to step S37. When it is determined that electric power is being supplied from the second main power source device 14b to the fourth load device 16d (step S36: NO), the fail-safe control is ended.

In step S37, the control device 34 controls the contactor device 22d to disconnect the second main power source device 14b from the fourth power supply circuit 12d and the second connection circuit 18b. Thereafter, the process proceeds to step S38.

In step S38, the control device 34 executes the first voltage reduction control on the second main power source device 14b. As a result, the difference between the output voltage of the second main power source device 14b and the output voltage of the first power storage device 24a, and the difference between the output voltage of the second main power source device 14b and the output voltage of the third power storage device 24c, are made equal to or less than the voltage threshold. Thereafter, the process proceeds to step S39.

In step S39, the control device 34 executes the first connection control on the first connection device 20a and the second connection device 20b. As a result, the first power supply circuit 12a and the second power supply circuit 12b are connected to each other via the first connection circuit 18a. Thereafter, the process proceeds to step S40.

In step S40, the control device 34 controls the third connection device 20c to connect the second auxiliary power storage device 19b to the third power supply circuit 12c. Thereafter, the fail-safe control is ended.

It should be noted that both the fail-safe control of the present embodiment and the fail-safe control of the first embodiment may be performed.

Third Embodiment

FIG. 22 is a schematic view of a moving object 44. The power supply system 10 is mounted on the moving object 44.

The moving object 44 of the present embodiment is an electric vertical take-off and landing aircraft (eVTOL aircraft). The moving object 44 includes eight VTOL rotors 46. The VTOL rotors 46 generate upward thrust for a fuselage 48. The moving object 44 includes eight electric motors 50. One electric motor 50 drives one VTOL rotor 46. The moving object 44 includes two cruise rotors 52. The cruise rotors 52 generate forward thrust for the fuselage 48. The moving object 44 includes four electric motors 54. Two electric motors 54 drive one cruise rotor 52.

Each of the first load device 16a, the second load device 16b, the third load device 16c, and the fourth load device 16d may include two electric motors 50 and one electric motor 54. Each of the first load device 16a, the second load device 16b, the third load device 16c, and the fourth load device 16d may include a low-voltage drive device in addition to the electric motors 50 and the electric motor 54.

The moving object 44 is not limited to an aircraft, and may be a ship, an automobile, a train, or the like.

The following notes (appendices) are further disclosed in relation to the above-described embodiments.

APPENDIX 1

The power supply system (10) includes: the first power supply circuit (12a) configured to supply, to the first load device (16a), DC power output from the first main power source device (14a); the second power supply circuit (12b) configured to supply, to the second load device (16b), DC power output from the second main power source device (14b); the first connection circuit (18a) configured to connect the first power supply circuit and the second power supply circuit to each other; and the first auxiliary power storage device (19a) connected to the first connection circuit in parallel with the first main power source device and the second main power source device. According to such a configuration, electric power can be supplied from the first auxiliary power storage device to both the first load device and the second load device. Accordingly, the capacities of the power storage devices included in the power supply system can be reduced. This in turn contributes to energy efficiency.

APPENDIX 2

The power supply system according to Appendix 1 may further include: the first power storage device (24a) connected to the first power supply circuit in parallel with the first main power source device; and the second power storage device (24b) connected to the second power supply circuit in parallel with the second main power source device. According to such a configuration, electric power can be supplied from the first auxiliary power storage device and the first power storage device to the first load device, and electric power can be supplied from the first auxiliary power storage device and the second power storage device to the second load device. Accordingly, the capacities of the power storage devices included in the power supply system can be reduced.

APPENDIX 3

The power supply system according to Appendix 1 or 2 may further include the first backflow prevention device (21a) configured to restrict the supply of electric power from the first connection circuit to the first auxiliary power storage device. According to such a configuration, when the SOC of the first power storage device and the SOC of the second power storage device are high, and the output voltage of the first power storage device and the output voltage of the second power storage device are higher than the output voltage of the first auxiliary power storage device, no electric power is supplied from the first auxiliary power storage device to the first load device and the second load device. On the other hand, when the SOC of the first power storage device and the SOC of the second power storage device are low, and the output voltage of the first power storage device and the output voltage of the second power storage device are lower than the output voltage of the first auxiliary power storage device, electric power is supplied from the first auxiliary power storage device to the first load device and the second load device.

APPENDIX 4

The power supply system according to any one of Appendices 1 to 3 may further include: the first connection device (20a) provided in the first connection circuit and configured to connect the first auxiliary power storage device to the first power supply circuit; and the second connection device (20b) provided in the first connection circuit and configured to connect the first auxiliary power storage device to the second power supply circuit. According to such a configuration, electric power can be selectively supplied from the first auxiliary power storage device to both or one of the first load device and the second load device.

APPENDIX 5

The power supply system according to Appendix 4 may further include: the first power storage device connected to the first power supply circuit in parallel with the first main power source device; the second power storage device connected to the second power supply circuit in parallel with the second main power source device; and the control device (34) configured to execute, on the first connection device and the second connection device, the first connection control for connecting the first power supply circuit and the second power supply circuit to each other via the first connection circuit, wherein the second main power source device is a power generation device, and in a case where the DC power output from the second main power source device is supplied to the first load device, the control device may execute, on the second main power source device, the first voltage reduction control for approximating the voltage of the first power supply circuit to the voltage of the second power supply circuit, and thereafter execute the first connection control. According to such a configuration, when the control device executes the first connection control on the first connection device, it is possible to suppress the flow of an overcurrent through the first load device and the first power storage device. Therefore, damage to the first load device and the first power storage device can be suppressed.

APPENDIX 6

In the power supply system according to Appendix 5, in the case where the DC power output from the second main power source device is supplied to the first load device, the control device may execute the first connection control after executing the first voltage reduction control for lowering the output voltage of the second main power source device until a difference between the output voltage of the second main power source device and the output voltage of the first power storage device becomes equal to or less than a predetermined voltage threshold. According to such a configuration, when the control device executes the first connection control on the first connection device, it is possible to suppress the flow of an overcurrent through the first load device and the first power storage device. Therefore, damage to the first load device and the first power storage device can be suppressed.

APPENDIX 7

The power supply system according to Appendix 5 or 6 may further include the second backflow prevention device (28b) configured to restrict the supply of electric power from the second power storage device to the second main power source device. According to such a configuration, the control device can make the output voltage of the second main power source device lower than the output voltage of the second power storage device by controlling the second main power source device.

APPENDIX 8

The power supply system according to any one of Appendices 5 to 7 may further include the contactor device (22a) configured to disconnect the first main power source device from the first power supply circuit and the first connection circuit, wherein in a case where the supply of the DC power from the first main power source device to the first power supply circuit is cut off, the control device may execute the first connection control after disconnecting the first power supply circuit and the first connection circuit from the first main power source device using the contactor device. According to such a configuration, when a short circuit occurs between the first main power source device and the first contactor device, the control device executes the first connection control on the first connection device, whereby it is possible to suppress the flow of an overcurrent through the second main power source device, the second load device, and the second power storage device. Therefore, damage to the second main power source device, the second load device, and the second power storage device can be suppressed.

APPENDIX 9

The power supply system according to any one of Appendices 5 to 8 may further include: the third power supply circuit (12c) configured to supply, to the third load device (16c), the DC power output from the first main power source device; the third power storage device (24c) connected to the third power supply circuit in parallel with the first main power source device; the fourth power supply circuit (12d) configured to supply, to the fourth load device (16d), the DC power output from the second main power source device; the fourth power storage device (24d) connected to the fourth power supply circuit in parallel with the second main power source device; the second connection circuit (18b) configured to connect the third power supply circuit and the fourth power supply circuit to each other; the second auxiliary power storage device (19b) connected to the second connection circuit in parallel with the first main power source device and the second main power source device; the third connection device (20c) provided in the second connection circuit and configured to connect the second auxiliary power storage device to the third power supply circuit; the fourth connection device (20d) provided in the second connection circuit and configured to connect the second auxiliary power storage device to the fourth power supply circuit; and the contactor device configured to disconnect the first main power source device from the first power supply circuit and the first connection circuit, wherein the first main power source device is a power generation device, the control device is configured to execute, on the third connection device and the fourth connection device, the second connection control for connecting the third power supply circuit and the fourth power supply circuit to each other via the second connection circuit, and in a case where the supply of the DC power from the first main power source device to the first load device is stopped, the control device may disconnect the first power supply circuit and the first connection circuit from the first main power source device using the contactor device, and execute, on the first main power source device, the second voltage reduction control for approximating the voltage of the third power supply circuit to the voltage of the fourth power supply circuit, and thereafter execute the second connection control. According to such a configuration, when the control device executes the second connection control on the second connection device, it is possible to suppress the flow of an overcurrent through the second main power source device, the second load device, the second power storage device, the fourth load device, and the fourth power storage device. Therefore, damage to the second main power source device, the second load device, the second power storage device, the fourth load device, and the fourth power storage device can be suppressed.

APPENDIX 10

The moving object (44) includes the power supply system according to any one of Appendices 1 to 9. According to such a configuration, electric power can be supplied from the first auxiliary power storage device to both the first load device and the second load device. Accordingly, the capacities of the power storage devices included in the power supply system can be reduced. This in turn contributes to energy efficiency.

The present invention is not limited to the above disclosure, and various modifications are possible without departing from the essence and gist of the present invention.

In the above disclosure, the first main power source device 14a and the second main power source device 14b are power generation devices. However, the first main power source device 14a and the second main power source device 14b may be power storage devices.

The invention claimed is:

1. A power supply system comprising:
a first power supply circuit configured to supply, to a first load device, direct current electric power output from a first main power source device;
a second power supply circuit configured to supply, to a second load device, direct current electric power output from a second main power source device;
a first connection circuit configured to connect the first power supply circuit and the second power supply circuit to each other; and
a first auxiliary power storage device connected to the first connection circuit in parallel with the first main power source device and the second main power source device and configured to supply electric power when an abnormality occurs in electric power supplied from at least one of the first power supply circuit or the second power supply circuit.

2. The power supply system according to claim 1, further comprising:
a first power storage device connected to the first power supply circuit in parallel with the first main power source device; and
a second power storage device connected to the second power supply circuit in parallel with the second main power source device.

3. The power supply system according to claim 1, further comprising a first backflow prevention device configured to restrict supply of electric power from the first connection circuit to the first auxiliary power storage device.

4. The power supply system according to claim 1, further comprising:
a first connection device provided in the first connection circuit and configured to connect the first auxiliary power storage device to the first power supply circuit; and
a second connection device provided in the first connection circuit and configured to connect the first auxiliary power storage device to the second power supply circuit.

5. The power supply system according to claim 4, further comprising:
a first power storage device connected to the first power supply circuit in parallel with the first main power source device;
a second power storage device connected to the second power supply circuit in parallel with the second main power source device; and
one or more processors that execute computer-executable instructions stored in a memory, wherein
the second main power source device is a power generation device, and
in a case where the direct current electric power output from the second main power source device is supplied to the first load device, the one or more processors execute the computer-executable instructions to cause the power supply system to execute, on the second main power source device, first voltage reduction control for approximating a voltage of the first power supply circuit to a voltage of the second power supply circuit, and thereafter execute, on the first connection device and the second connection device, first connection control for connecting the first power supply circuit and the second power supply circuit to each other via the first connection circuit.

6. The power supply system according to claim 5, wherein
in the case where the direct current electric power output from the second main power source device is supplied to the first load device, the one or more processors cause the power supply system to execute the first connection control after executing the first voltage reduction control for lowering an output voltage of the second main power source device until a difference between the output voltage of the second main power source device and an output voltage of the first power storage device becomes equal to or less than a predetermined voltage threshold.

7. The power supply system according to claim 5, further comprising a second backflow prevention device configured to restrict supply of electric power from the second power storage device to the second main power source device.

8. The power supply system according to claim 5, further comprising a contactor device configured to disconnect the first main power source device from the first power supply circuit and the first connection circuit, wherein
in a case where supply of the direct current electric power from the first main power source device to the first power supply circuit is cut off, the one or more processors cause the power supply system to execute the first connection control after disconnecting the first power supply circuit and the first connection circuit from the first main power source device using the contactor device.

9. The power supply system according to claim 5, further comprising:
a third power supply circuit configured to supply, to a third load device, the direct current electric power output from the first main power source device;
a third power storage device connected to the third power supply circuit in parallel with the first main power source device;

a fourth power supply circuit configured to supply, to a fourth load device, the direct current electric power output from the second main power source device;
a fourth power storage device connected to the fourth power supply circuit in parallel with the second main power source device;
a second connection circuit configured to connect the third power supply circuit and the fourth power supply circuit to each other;
a second auxiliary power storage device connected to the second connection circuit in parallel with the first main power source device and the second main power source device;
a third connection device provided in the second connection circuit and configured to connect the second auxiliary power storage device to the third power supply circuit;
a fourth connection device provided in the second connection circuit and configured to connect the second auxiliary power storage device to the fourth power supply circuit; and
a contactor device configured to disconnect the first main power source device from the first power supply circuit and the first connection circuit, wherein
the first main power source device is a power generation device, and
in a case where supply of the direct current electric power from the first main power source device to the first load device is stopped, the one or more processors cause the power supply system to disconnect the first power supply circuit and the first connection circuit from the first main power source device using the contactor device, and execute, on the first main power source device, second voltage reduction control for approximating a voltage of the third power supply circuit to a voltage of the fourth power supply circuit, and thereafter execute, on the third connection device and the fourth connection device, second connection control for connecting the third power supply circuit and the fourth power supply circuit to each other via the second connection circuit.

10. A moving object comprising a power supply system, wherein the power supply system comprises:
a first power supply circuit configured to supply, to a first load device, direct current electric power output from a first main power source device;
a second power supply circuit configured to supply, to a second load device, direct current electric power output from a second main power source device;
a first connection circuit configured to connect the first power supply circuit and the second power supply circuit to each other; and
a first auxiliary power storage device connected to the first connection circuit in parallel with the first main power source device and the second main power source device and configured to supply electric power when an abnormality occurs in electric power supplied from at least one of the first power supply circuit or the second power supply circuit.

11. A power supply system comprising:
a first power supply circuit configured to supply, to a first load device, direct current electric power output from a first main power source device;
a second power supply circuit configured to supply, to a second load device, direct current electric power output from a second main power source device;
a first connection circuit configured to connect the first power supply circuit and the second power supply circuit to each other;
a first auxiliary power storage device connected to the first connection circuit in parallel with the first main power source device and the second main power source device;
a first connection device provided in the first connection circuit and configured to connect the first auxiliary power storage device to the first power supply circuit; and
a second connection device provided in the first connection circuit and configured to connect the first auxiliary power storage device to the second power supply circuit.

12. The power supply system according to claim 11, further comprising:
a first power storage device connected to the first power supply circuit in parallel with the first main power source device;
a second power storage device connected to the second power supply circuit in parallel with the second main power source device; and
one or more processors that execute computer-executable instructions stored in a memory, wherein
the second main power source device is a power generation device, and
in a case where the direct current electric power output from the second main power source device is supplied to the first load device, the one or more processors execute the computer-executable instructions to cause the power supply system to execute, on the second main power source device, first voltage reduction control for approximating a voltage of the first power supply circuit to a voltage of the second power supply circuit, and thereafter execute, on the first connection device and the second connection device, first connection control for connecting the first power supply circuit and the second power supply circuit to each other via the first connection circuit.

13. The power supply system according to claim 11, wherein
in the case where the direct current electric power output from the second main power source device is supplied to the first load device, the one or more processors cause the power supply system to execute the first connection control after executing the first voltage reduction control for lowering an output voltage of the second main power source device until a difference between the output voltage of the second main power source device and an output voltage of the first power storage device becomes equal to or less than a predetermined voltage threshold.

14. The power supply system according to claim 11, further comprising a second backflow prevention device configured to restrict supply of electric power from the second power storage device to the second main power source device.

15. The power supply system according to claim 11, further comprising a contactor device configured to disconnect the first main power source device from the first power supply circuit and the first connection circuit, wherein
in a case where supply of the direct current electric power from the first main power source device to the first power supply circuit is cut off, the one or more processors cause the power supply system to execute the first connection control after disconnecting the first power supply circuit and the first connection circuit from the first main power source device using the contactor device.

16. The power supply system according to claim 11, further comprising:
- a third power supply circuit configured to supply, to a third load device, the direct current electric power output from the first main power source device;
- a third power storage device connected to the third power supply circuit in parallel with the first main power source device;
- a fourth power supply circuit configured to supply, to a fourth load device, the direct current electric power output from the second main power source device;
- a fourth power storage device connected to the fourth power supply circuit in parallel with the second main power source device;
- a second connection circuit configured to connect the third power supply circuit and the fourth power supply circuit to each other;
- a second auxiliary power storage device connected to the second connection circuit in parallel with the first main power source device and the second main power source device;
- a third connection device provided in the second connection circuit and configured to connect the second auxiliary power storage device to the third power supply circuit;
- a fourth connection device provided in the second connection circuit and configured to connect the second auxiliary power storage device to the fourth power supply circuit; and
- a contactor device configured to disconnect the first main power source device from the first power supply circuit and the first connection circuit, wherein the first main power source device is a power generation device, and in a case where supply of the direct current electric power from the first main power source device to the first load device is stopped, the one or more processors cause the power supply system to disconnect the first power supply circuit and the first connection circuit from the first main power source device using the contactor device, and execute, on the first main power source device, second voltage reduction control for approximating a voltage of the third power supply circuit to a voltage of the fourth power supply circuit, and thereafter execute, on the third connection device and the fourth connection device, second connection control for connecting the third power supply circuit and the fourth power supply circuit to each other via the second connection circuit.

17. A moving object comprising a power supply system, wherein the power supply system comprises:
- a first power supply circuit configured to supply, to a first load device, direct current electric power output from a first main power source device; a second power supply circuit configured to supply, to a second load device, direct current electric power output from a second main power source device;
- a first connection circuit configured to connect the first power supply circuit and the second power supply circuit to each other;
- a first auxiliary power storage device connected to the first connection circuit in parallel with the first main power source device and the second main power source device;
- a first connection device provided in the first connection circuit and configured to connect the first auxiliary power storage device to the first power supply circuit; and
- a second connection device provided in the first connection circuit and configured to connect the first auxiliary power storage device to the second power supply circuit.

* * * * *